(12) United States Patent
Nesbitt et al.

(10) Patent No.: US 6,422,953 B1
(45) Date of Patent: *Jul. 23, 2002

(54) GOLF BALL

(75) Inventors: R. Dennis Nesbitt, Westfield; Mark L. Binette, Ludlow; John L. Nealon, Springfield, all of MA (US); Michael J. Sullivan, Barrington, RI (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,181

(22) Filed: Jan. 22, 2000

Related U.S. Application Data

(63) Continuation-in-part of application No. 09/371,994, filed on Aug. 11, 1999, which is a continuation-in-part of application No. 08/975,799, filed on Nov. 21, 1997, application No. 09/490,181, which is a continuation-in-part of application No. 09/226,727, filed on Jan. 7, 1999, now Pat. No. 6,277,920, and a continuation-in-part of application No. 09/226,340, filed on Jan. 6, 1999, which is a continuation-in-part of application No. 08/819,945, filed on Mar. 19, 1997, now Pat. No. 5,895,105, which is a continuation of application No. 08/370,224, filed on Jan. 9, 1995, now abandoned, which is a continuation of application No. 07/893,277, filed on Jun. 4, 1992, now abandoned, which is a continuation-in-part of application No. 07/874,066, filed on Apr. 24, 1992, now abandoned.

(60) Provisional application No. 60/116,846, filed on Jan. 22, 1999, provisional application No. 60/117,328, filed on Jan. 22, 1999, provisional application No. 60/116,900, filed on Jan. 22, 1999, provisional application No. 60/116,901, filed on Jan. 22, 1999, provisional application No. 60/116,899, filed on Jan. 22, 1999, and provisional application No. 60/116,870, filed on Jan. 22, 1999.

(51) Int. Cl.⁷ .............................. A63B 37/06
(52) U.S. Cl. ..................................... 473/376
(58) Field of Search ................ 473/371, 372, 473/377, 378, 376

(56) References Cited

U.S. PATENT DOCUMENTS

| | | | |
|---|---|---|---|
| 3,421,766 A | 1/1969 | Chmiel et al. | |
| 3,432,165 A | 3/1969 | Haines et al. | |
| 3,478,132 A | 11/1969 | Randolph | |
| 3,572,721 A | 3/1971 | Harrison et al. | |
| 3,883,145 A | 5/1975 | Cox et al. | |
| 4,076,255 A | 2/1978 | Moore | |
| 4,082,288 A | 4/1978 | Martin et al. | |
| 4,264,075 A | 4/1981 | Miller et al. | |
| 4,266,772 A | 5/1981 | Martin et al. | |
| 4,328,133 A | 5/1982 | Ogawa et al. | |
| 4,683,257 A * | 7/1987 | Kakiuchi et al. | 524/432 |
| 4,696,475 A | 9/1987 | Tomita et al. | |
| 4,726,590 A | 2/1988 | Molitor | |
| 4,838,556 A | 6/1989 | Sullivan | |
| 4,844,471 A | 7/1989 | Terence et al. | |
| 4,852,884 A | 8/1989 | Sullivan | |
| 4,929,678 A | 5/1990 | Hamada et al. | |
| 4,931,376 A | 6/1990 | Hattori et al. | |
| 4,955,613 A | 9/1990 | Gendreau et al. | |
| 4,974,852 A | 12/1990 | Hiraoka et al. | |
| 4,984,803 A | 1/1991 | Llort et al. | |

(List continued on next page.)

FOREIGN PATENT DOCUMENTS

| | | |
|---|---|---|
| CA | 674595 | 11/1963 |
| CA | 713631 | 7/1965 |
| GB | 963380 | 6/1978 |
| JP | 91059931 | 9/1991 |

*Primary Examiner*—Mark S. Graham
*Assistant Examiner*—Raeann Gorden

(57) ABSTRACT

Disclosed herein is a golf ball utilizing a core that comprises at least two particular types of polybutadiene. In one aspect, a combination of a polybutadiene obtained from a cobalt catalyst is used in conjunction with a polybutadiene obtained from a neodymium catalyst. Also disclosed are golf balls comprising particular cover compositions. In one aspect, a cover composition is disclosed that includes a sodium ionomer, a magnesium ionomer, and a zinc ionomer. The golf balls exhibit improved distance while providing a soft sound and feel.

20 Claims, 15 Drawing Sheets

U.S. PATENT DOCUMENTS

| | | | |
|---|---|---|---|
| 4,986,545 A | 1/1991 | Sullivan | |
| 5,082,285 A | 1/1992 | Hamada et al. | |
| 5,098,105 A | 3/1992 | Sullivan | |
| 5,120,791 A | 6/1992 | Sullivan | |
| 5,131,662 A | 7/1992 | Pollitt | |
| 5,187,013 A | 2/1993 | Sullivan | |
| 5,209,485 A | 5/1993 | Nesbitt et al. | |
| 5,215,308 A | 6/1993 | Nesbitt | |
| 5,306,760 A | 4/1994 | Sullivan | |
| 5,312,857 A | 5/1994 | Sullivan | |
| 5,324,783 A | 6/1994 | Sullivan | |
| 5,328,959 A | 7/1994 | Sullivan | |
| 5,330,837 A | 7/1994 | Sullivan | |
| 5,338,610 A | 8/1994 | Sullivan | |
| RE35,293 E | 7/1996 | Hiraoka et al. | |
| 5,542,677 A | 8/1996 | Sullivan et al. | |
| 5,580,057 A | 12/1996 | Sullivan et al. | |
| 5,585,440 A | 12/1996 | Yamada et al. | |
| 5,591,803 A | 1/1997 | Sullivan et al. | |
| 5,688,191 A | 11/1997 | Cavallaro et al. | |
| 5,691,006 A | 11/1997 | Rajagopalan | |
| 5,703,166 A | 12/1997 | Rajagopalan et al. | |
| 5,730,664 A * | 3/1998 | Asakura et al. | 473/373 |
| 5,733,206 A | 3/1998 | Nesbitt et al. | |
| 5,759,676 A | 6/1998 | Cavallaro et al. | |
| 5,779,561 A | 7/1998 | Sullivan et al. | |
| 5,779,562 A | 7/1998 | Melvin et al. | |
| 5,783,293 A | 7/1998 | Lammi | |
| 5,803,831 A | 9/1998 | Sullivan et al. | |
| 5,810,678 A | 9/1998 | Cavallaro et al. | |
| 5,813,923 A | 9/1998 | Cavallaro et al. | |
| 5,824,746 A | 10/1998 | Harris et al. | |
| 5,830,087 A | 11/1998 | Sullivan et al. | |
| 5,833,553 A | 11/1998 | Sullivan et al. | |
| 5,836,831 A | 11/1998 | Stanton et al. | |
| 5,856,388 A | 1/1999 | Harris et al. | |
| 5,857,925 A | 1/1999 | Sullivan et al. | |
| 5,866,663 A | 2/1999 | Brookhart et al. | |
| 5,869,578 A | 2/1999 | Rajagopalan | |
| 5,873,796 A | 2/1999 | Cavallero et al. | |
| 5,880,241 A | 3/1999 | Brookhart et al. | |
| 5,882,567 A | 3/1999 | Cavallaro et al. | |
| 5,885,172 A | 3/1999 | Herbert | |
| 5,886,224 A | 3/1999 | Brookhart et al. | |
| 5,891,963 A | 4/1999 | Brookhart et al. | |
| 5,891,973 A | 4/1999 | Sullivan et al. | |
| 5,902,855 A | 5/1999 | Sullivan | |
| 5,916,989 A | 6/1999 | Brookhart, III et al. | |
| 5,922,252 A | 7/1999 | Stanton et al. | |

* cited by examiner

GOLF BALL

CROSS REFERENCE TO RELATED APPLICATIONS

This application claims the benefit of the filing date of U.S. Provisional Application No. 60/116, 846, filed Jan. 22, 1999; No. 60/117,328, filed Jan. 22, 1999; No. 60/116,900, filed Jan. 22, 1999; No. 60/116,901, filed Jan. 22, 1999; No. 60/116,899, filed Jan. 22, 1999; and No. 60/116,870, filed Jan. 22, 1999. In addition, this application is a continuation-in-part application of U.S. application Ser. No. 09/371,994, filed Aug. 11, 1999, which is a continuation-in-part or U.S. application Ser. No. 08/975,799 filed Nov. 21, 1997. This application is also a continuation-in-part of U.S. application Ser. No. 09/226,727 filed Jan. 7,1999, and of U.S. application Ser. No. 09/226,340 filed Jan. 6, 1999, now U.S. Pat. No. 6,277,920, both of which are continuations-in-part of U.S. application Ser. No. 08/819,945 filed Mar. 19,1997 now U.S. Pat. No. 5,895,105; which is a continuation of U.S. application Ser. No. 08/370,224 filed Jan. 9, 1995 now abandoned; which is a continuation of U.S. application Ser. No. 07/893,277 filed Jun. 4, 1992 now abandoned; and which is a continuation-in-part of U.S. application Ser. No. 07/874,066 filed on Apr. 24, 1992 now abandoned.

FIELD OF THE INVENTION

The present invention is directed to golf balls utilizing improved polybutadiene compositions for use in molded golf ball cores in conjunction with a particular type of cover composition. In one aspect, the improved polybutadiene compositions utilize one or more particular butadiene rubbers synthesized through the use of neodymium and cobalt-containing catalysts. The polybutadiene is preferably an ultra-high Mooney viscosity polybutadiene. In another aspect, the improved polybutadiene compositions utilize a particular solid butadiene rubber that exhibits an ultra-high Mooney viscosity and/or a high molecular weight and a low dispersity. The use of such butadiene rubber and/or blend of butadiene rubbers increases the resiliency of the ball. In addition, significantly improved mixing properties are achieved. In another aspect, the golf balls feature particular cover constructions that result in the balls exhibiting a soft feel and particular mechanical impedance.

BACKGROUND OF THE INVENTION

Two of the principal properties involved in the performance of golf balls are resilience and hardness. Resilience is determined by the coefficient of restitution (referred to as "C.O.R."), also expressed as the constant "e", which is the ratio of the relative velocity of two elastic spheres after direct impact to that before impact, or more generally, the ratio of the outgoing velocity to incoming velocity of a rebounding ball. As a result, the coefficient of restitution (i.e. "e") can vary from zero to one, with one being equivalent to an elastic collision and zero being equivalent to an inelastic collision. Hardness is determined as the deformation (i.e. compression) of the ball under various load conditions applied across the ball's diameter. The lower the compression value, the harder the material.

Resilience (C.O.R.), along with additional factors such as clubhead speed, angle of trajectory, and ball configuration (i.e. dimple pattern), generally determine the distance a ball will travel when hit. Since clubhead speed and the angle of trajectory are not factors easily controllable, particularly by golf ball manufacturers, the factors of concern among manufacturers are the coefficient of restitution (C.O.R.) and the surface configuration of the ball.

In this regard, the coefficient of restitution of a golf ball is generally measured by propelling a ball at a given speed against a hard surface and electronically measuring the ball's incoming and outgoing velocity. The coefficient of restitution must be carefully controlled in all commercial golf balls in order for the ball to be within the specifications regulated by the United States Golfers Association ("U.S.G.A."). Along this line, the U.S.G.A. standards indicate that a "regulation" ball cannot have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings.

Polybutadiene has been utilized in forming golf ball cores. Prior artisans have investigated utilizing various grades of polybutadiene in core compositions. For example, such attempts are described in U.S. Pat. Nos. 5,385,440; 4,931,376; 4,683,257; 4,955,613; and 4,984,803; and in Japanese Patent References JP 58225138 and JP 7268132, all of which are hereby incorporated by reference. Although some of the core compositions described in these disclosures are satisfactory, a need remains for an improved composition for forming golf ball cores.

For example, U.S. Pat. No. 4,929,678 relates to a golf ball formed from a polybutadiene core composition having a broad Mooney viscosity of 45–90, preferably 50–70, and more preferably 55 to 65. However the dispersity of the core composition is limited to the range of 4.0 to 8.0, and preferably 4.0 to 6.0. According to the '678 patent, a dispersity of less then 4.0 produces deleterious workability.

Similarly, U.S. Pat. No. 5,082,285 generally discloses the preparation of a solid golf ball from an ultra-high molecular weight polybutadiene having a number average molecular weight of $40 \times 10^4$ or more, which has dispersity characteristics as noted. See also U.S. Pat. Nos. 4,974,852 and 5,585,440, wherein Mooney viscosity is discussed without reference to dispersity.

Accordingly, it is an object of the present invention to provide an improved polybutadiene composition which, when utilized to formulate golf ball cores, produces golf balls exhibiting enhanced C.O.R. without increasing hardness. An additional object of the invention is to produce a golf ball core from a polybutadiene composition having a high Mooney viscosity and/or a high molecular weight and low dispersity.

Accordingly, it is another object of the present invention to provide an improved core composition which, when utilized to formulate golf ball cores, produces golf balls exhibiting enhanced C.O.R. and improved processing.

The spin rate and "feel" of a golf ball are particularly important aspects to consider when selecting a golf ball for play. A golf ball with the capacity to obtain a high rate of spin allows a skilled golfer the opportunity to maximize control over the ball. This is particularly beneficial when hitting a shot on an approach to the green.

Golfers have traditionally judged the softness of a ball by the sound of the ball as it is hit with a club. Soft golf balls tend to have a low frequency sound when struck with a club. This sound is associated with a soft feel and thus is desirable to a skilled golfer.

Balata covered wound golf balls are known for their soft feel and high spin rate potential. However, balata covered balls suffer from the drawback of low durability. Even in normal use, the balata covering can become cut and scuffed, making the ball unsuitable for further play. Furthermore, the coefficient of restitution of wound balls is reduced by low temperatures.

The problems associated with balata covered balls have resulted in the widespread use of durable ionomeric resins as golf ball covers. However, balls made with ionomer resin covers typically have PGA compression ratings in the range of 90–100. Those familiar with golf ball technology and manufacture will recognize that golf balls with PGA compression ratings in this range are considered to be somewhat harder than conventional balata covered balls. It would be useful to develop a golf ball having a durable cover which has the sound and feel of a balata covered wound ball.

These and other objects and features of the invention will be apparent from the following summary and description of the invention and from the claims.

SUMMARY OF THE INVENTION

The present invention achieves all of the foregoing objectives and provides, in a first aspect, a golf ball comprising a core that includes a particular combination of polybutadiene rubbers, and a cover disposed about the core which includes a specific combination of ionomer resins. The polybutadiene rubbers used in the particular combination include a first polybutadiene rubber that is obtained utilizing a cobalt catalyst and which exhibits a Mooney viscosity in the range of from about 70 to about 83. The combination of polybutadiene rubbers also includes a second polybutadiene rubber that is obtained utilizing a neodymium series catalyst and which exhibits a Mooney viscosity of from about 30 to about 70. The cover composition used in this golf ball includes a combination of three ionomers. That combination includes a sodium ionomer, a magnesium ionomer, and a zinc ionomer.

In a second aspect, the present invention provides a golf ball comprising a core that includes a particular combination of first and second polybutadiene rubbers, in particular weight proportions, and a cover generally enclosing the core which is formed from a certain combination of ionomers. Specifically, the core includes from about 30% by weight of a first polybutadiene rubber obtained from a cobalt or cobalt-based catalyst, and about 30% to about 45% by weight of a second polybutadiene rubber obtained from a neodymium or lanthanide-series catalyst. The cover of the golf ball includes a sodium ionomer, a magnesium ionomer, and a zinc ionomer.

In yet another aspect, the present invention provides a golf ball comprising a core including a certain combination of polybutadiene rubbers, which is enclosed with a cover formed from a particular set of ionomers. The core includes from about 20% to about 30% by weight of a first polybutadiene rubber obtained from a cobalt catalyst and which exhibits a Mooney viscosity in the range of from about 70 to about 83. The core further includes from about 30% to about 45% of a second polybutadiene rubber obtained from a neodymium catalyst and which exhibits a Mooney viscosity of from about 30 to about 70. The cover which is disposed about the core includes from about 40% to about 50% of a sodium ionomer, from about 40% to about 50% of a magnesium ionomer, and from about 5% to about 15% of a zinc ionomer.

Further scope of the applicability of the invention will become apparent from the detailed description provided below.

DETAILED DESCRIPTION OF THE PREFERRED EMBODIMENTS

Figure 1:
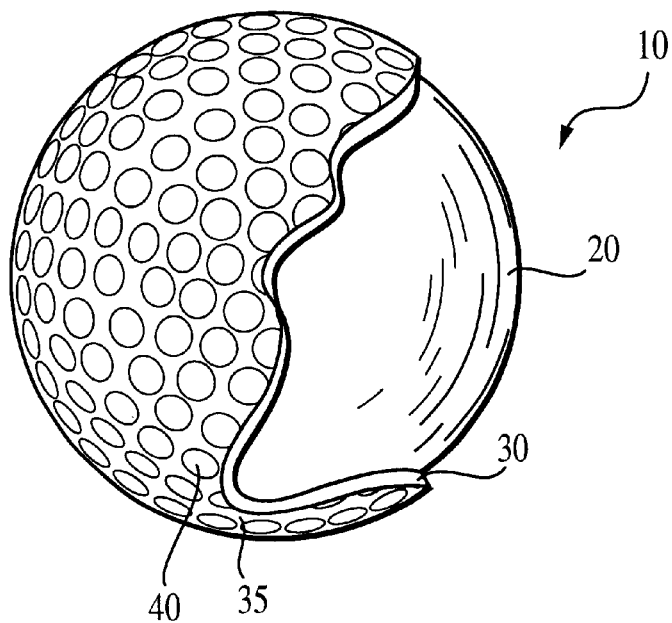
FIG. 1 is a partial sectional view of a first preferred embodiment golf ball in accordance with the present invention.

The present invention provides a new, improved class of golf balls. As described herein, these golf balls feature a core comprising a particular combination of butadiene rubbers, and a cover comprising a specific array of ionomer resins.

Cores

The present invention is directed to improved compositions which, when utilized in formulating golf ball cores, produce cores that exhibit a relatively high degree of resilience. The invention is also directed to improving the processability of polybutadiene, particularly in forming golf ball cores. In these regards, it has been found that the use of a blend of particular polybutadiene resins in a golf ball core composition has the effect of increasing the resiliency of the resultant cores and greatly facilitates core formation.

The compositions of the present invention comprise one or more rubber or elastomeric components and an array of non-rubber or non-elastomeric components. The rubber components of the core compositions of the invention comprise a particular polybutadiene synthesized with cobalt and having an ultra-high Mooney viscosity and certain molecular weight characteristics described in detail below, one or more particular polybutadienes synthesized with neodymium, and one or more other optional polybutadienes. In some applications, polybutadienes synthesized with nickel catalysts may be used in combination with or instead of polybutadienes synthesized with cobalt catalysts. And, polybutadienes synthesized with lanthanide series catalysts may be used in combination with or instead of polybutadienes synthesized with neodymium catalysts. The non-rubber components of the core compositions of the invention comprise one or more crosslinking agents which preferably include an unsaturated carboxylic acid component, a free radical initiator to promote cross linking, one or more optional modifying agents, fillers, moldability additives, processing additives, and dispersing agents, all of which are described in greater detail below.

The first preferred polybutadiene resin for use in the present invention composition has a relatively ultra high Mooney viscosity. A "Mooney unit" is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$(100° C.], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\sum W_i}{\sum W_i/M_i}$$

where $W_i$ is the molecular weight of a fraction or sample of the polymer and $M_i$ is the total number of fractions or samples.

"Weight average molecular weight," $M_w$ is defined as:

$$M_w = \frac{\sum W_i M_i}{\sum W_i}$$

where $W_i$ and $M_i$ have the same meanings as noted above.

The "Z-average molecular weight," $M_z$, is defined as:

$$M_z = \frac{\sum W_i M_i^2}{\sum W_i M_i}$$

where $W_i$ and $M_i$ have the same meanings as noted above. "$M_{peak}$" is the molecular weight of the most common fraction or sample, i.e. having the greatest population.

Considering these various measures of molecular weight, provides an indication of the distribution or rather the "spread" of molecular weights of the polymer under review.

A common indicator of the degree of molecular weight distribution of a polymer is its "polydispersity", P:

$$P = \frac{M_w}{M_n}$$

Polydispersity, also referred to as "dispersity", also provides an indication of the extent to which the polymer chains share the same degree of polymerization. If the polydispersity is 1.0, then all polymer chains must have the same degree of polymerization. Since weight average molecular weight is always equal to or greater than the number average molecular weight, polydispersity, by definition, is equal to or greater than 1.0:

$$P \geq 1.0$$

The first particular polybutadiene for use in the preferred embodiment compositions of the present invention exhibits a Mooney viscosity of from about 65 to about 85, and preferably from about 70 to about 83. The first particular polybutadiene has a number average molecular weight $M_n$ of from about 90,000 to about 130,000; and preferably from about 100,000 to about 120,000. The first particular polybutadiene has a weight average molecular weight $M_w$ of from about 250,000 to about 350,000; and preferably from about 290,000 to about 310,000. The first particular polybutadiene has a Z-average molecular weight $M_z$ of about 600,000 to about 750,000; and preferably from about 660,000 to about 700,000. The first particular polybutadiene has a peak molecular weight $M_{peak}$ of about 150,000 to about 200,000; and preferably from about 170,000 to about 180,000.

The polydispersity of the first particular polybutadiene for use in the preferred embodiment compositions typically ranges from about 1.9 to about 3.9; and preferably from about 2.4 to about 3.1. Most preferably, the polydispersity is about 2.7.

The first particular polybutadiene for use in the preferred embodiment compositions preferably contains a majority fraction of polymer chains containing a cis-1,4 bond, more preferably, having a cis-1,4 polybutadiene content of about 90%, and most preferably, having a cis-1,4 polybutadiene content of at least about 95%. Another characteristic of the first preferred polybutadiene is that it is obtained or synthesized by utilizing a cobalt or cobalt-based catalyst. As noted herein, in some applications, a polybutadiene synthesized by using a nickel catalyst may be employed with, or in place of, the polybutadiene synthesized with a cobalt catalyst.

A commercially available polybutadiene corresponding to the noted first preferred ultra high viscosity polybutadiene, and which is suitable for use in the preferred embodiment compositions in accordance with the present invention is available under the designation Cariflex BCP 820, from Shell Chimie of France. Although this polybutadiene produces cores exhibiting higher C.O.R. values, it is somewhat difficult to process using conventional equipment. The properties and characteristics of this preferred polybutadiene are set forth below in Table 1.

TABLE 1

Properties of Shell Chimie BCP 820 (Also Known As BR-1202J)

| Property | Value | |
|---|---|---|
| Mooney Viscosity (approximate) | 70–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.4–3.1 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The second polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60. While the second polybutadiene provides covers exhibiting higher C.O.R. values, it exhibits very poor cold flow properties and very high dry swell characteristics.

Examples of such second polybutadienes obtained by using a neodymium-based catalyst include Neo Cis 40, Neo Cis 60 from Enichem and CB-22, CB-23, and CB-24 from Bayer. The properties of these polybutadienes are given below.

TABLE 2

Properties of Neo Cis

| Properties of Raw Polymer Microstructure | |
|---|---|
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |
| Properties of compound (typical) Vulcanization at 145° C. | |
| Tensile strength, 35' cure, | 16 MPa |
| Elongation, 35' cure, | 440% |
| 300% modulus, 35' cure, | 95 MPa |

TABLE 3A

Properties of CB-22

| TESTS | RESULTS | SPECIFICATIONS |
|---|---|---|
| 1. Mooney-Viscosity ML1 + 4 100 Cel/ASTM-sheet | | |
| ML1 + 1 Minimum | 58 | MIN.58 ME |
| Maximum | 63 | MAX.68 ME |
| Median | 60 | 58–68 ME |

TABLE 3A-continued

Properties of CB-22

| TESTS | RESULTS | SPECIFICATIONS |
|---|---|---|
| 2. Content of ash DIN 53568 Ash | 0.1 | MAX.0.5% |
| 3. Volatile matter heating 3h/105 Cel Loss in weight | 0.11 | MAX.0.5% |
| 4. Organic acid Bayer Nr.18 Acid | 0.33 | MAX.1.0% |
| 5. CIS-1,4 content IR-spectroscopy CIS 1,4 | 97.62 | MIN.96.0% |
| 6. Vulcanization behavior Monsanto MDR/160 Cel DIN 53529 Compound after | | |
| ts01 | 3.2 | 2.5–4.1 min |
| t50 | 8.3 | 6.4–9.6 min |
| t90 | 13.2 | 92–14.0 min |
| s'min | 4.2 | 3.4–4.4 dN.m |
| s'max | 21.5 | 17.5–21.5 dN.m |
| 7. Informative data Vulcanization 150 Cel 30 min | | |
| Tensile | ca. 15,0 | |
| Elongation at break | ca.450 | |
| Stress at 300% elongation | ca. 9,5 | |

TABLE 3B

Properties of CB-23

| TESTS | RESULTS | SPECIFICATIONS |
|---|---|---|
| 1. Mooney-Viscosity ML1 + 4 100 Cel/ASTM-sheet | | |
| ML1+ 4 Minimum | 50 | MIN.46 ME |
| Maximum | 54 | MAX.56 ME |
| Median | 51 | 46–56ME |
| 2. Content of ash DIN 53568 Ash | 0.09 | MAX.0.5% |
| 3. Volatile matter DIN 53526 Loss in weight | 0.19 | MAX.0.5% |
| 4. Organic acid Bayer Nr.18 Acid | 0.33 | MAX.1.0% |
| 5. CIS-1,4 content IR-spectroscopy CIS 1,4 | 97.09 | MIN.96.0% |
| 6. Vulcanization behavior Monsanto MDR/160 Cel DIN 53529 | | |
| Compound after | MIN.96.0 | |
| ts01 | 34 | 2.4–4.0 min |
| t50 | 8.7 | 5.8–9.0 min |
| t90 | 13.5 | 8.7–13.5 min |
| s'min | 3.1 | 2.7–3.8 dN.m |
| s'max | 20.9 | 17.7–21.7 dN.m |
| 7. Vulcanization test with ring Informative data | | |
| Tensile | ca 15,5 | |
| Elongation at break | ca. 470 | |
| Stress at 300% elongation | ca. 9,3 | |

TABLE 3C

Properties of CB-24

| TESTS | RESULTS | SPECIFICATIONS |
|---|---|---|
| 1. Mooney-Viscosity ML1 + 4 100 Cel/ASTM-sheet | | |
| ML1 + 4 Minimum | 44 | MIN.39 ME |
| Maximum | 46 | MAX.49 ME |
| Median | 45 | 39–49 ME |
| 2. Content of ash DIN 53568 Ash | 0.12 | MAX.0.5% |
| 3. Volatile matter DIN 53526 Loss in weight | 0.1 | MAX.0.5% |
| 4. Organic acid Bayer Nr.18 Acid | 0.29 | MAX.1.0% |
| 5. CIS-1,4 content R-spectroscopy CIS 1,4 | 96.73 | MIN.96.0% |
| 6. Vulcanization behavior Monsanto MDR/160 Cel DIN 53529 Compound after masticator | | |
| ts01 | 3.4 | 2.6–4.2 min |
| t50 | 8.0 | 6,2–9,4 min |
| t90 | 12.5 | 9,6–14,4 min |
| s'min | 2.8 | 2.0–3.0 dN.m |
| s'max | 19.2 | 16.3–20.3 dN.m |
| 7. Informative data Vulcanization 150 Cel 30 min | | |
| Tensile | ca 15,0 | |
| Elongation at break | ca. 470 | |
| Stress at 300% elongation | ca. 9,1 | |

It has been found that when the first and second polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

The compositions of the present invention may also utilize other polybutadiene resins in addition to the noted first and second particular polybutadienes. For example, Cariflex BR-1220 polybutadiene available from Shell Chemical (see Table 4 below); and Taktene 220 polybutadiene available from Bayer Corp. of Orange, Tex. (see Tables 5A and 5B below) may be utilized as other polybutadienes in combination with the particular ultra-high Mooney viscosity polybutadiene components described herein. It is also contemplated that these polybutadienes could be used by themselves and without the particular first and second polybutadienes. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 4

Properties of Cariflex BR-1220 Polybutadiene

Physical Properties:

Polybutadiene Rubber
CIS 1,4 Content- 97%–99% Min.

TABLE 4-continued

Properties of Cariflex BR-1220 Polybutadiene

Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex) (ML1 + 4 @ 212° F.)
90% Cure - 10.0–13.0
Polydispersity 2.5–3.5

| Molecular Weight Data: | Trial 1 | Trial 2 |
|---|---|---|
| $M_n$ | 80,000 | 73,000 |
| $M_w$ | 220,000 | 220,000 |
| $M_z$ | 550,000 | |
| $M_{peak}$ | 110,000 | |

TABLE 5A

Properties of Taktene 220 Polybutadiene

Physical Properties:

Polybutadiene Rubber
CIS 1,4 Content (%) - 98% Typical
Stabilizer Type - Non Staining 1.0–1.3%
Total Ash - 0.25 Max.
Raw Polymer Mooney Visc. -35–45 40 Typical
(ML1 + 4' @ 212 Deg. F./212° F.)
Specific Gravity - 0.91
Color - Transparent - almost colorless (15 APHA Max.)
Moisture % - 0.30% Max. ASTM 1416-76 Hot Mill Method

TABLE 5B

Properties of Taktene 220 Polybutadiene

| Product Description | A low Mooney viscosity, non-staining, solution polymerized, high cis-1,4-polybutadiene rubber. | | |
|---|---|---|---|
| Raw Polymer Properties | Property | Range | Test Method |
| | Mooney viscosity 1 + 4(212° F.) | 40 ± 5 | ASTM D 1646 |
| | Volatile matter (wt %) | 0.3 max. | ASTM D 1416 |
| | Total Ash (wt %) | 0.25 max. | ASTM D 1416 |
| Cure[(1)(2)] Characteristics | Minimum torque | | |
| | $M_L$ (dN.m) | 9.7 ± 2.2 | ASTM D 2084 |
| | (lbf).in) | 8.6 ± 1.9 | ASTM D 2084 |
| | Maximum torque | | |
| | MH (dN.m) | 35.7 ± 4.8 | ASTM D 2084 |
| | (lbf. in) | 31.6 ± 4.2 | ASTM D 2084 |
| | $t_21$ (min) | 4 ± 1.1 | ASTM D 2084 |
| | t'50 (min) | 9.6 ± 2.5 | ASTM D 2084 |
| | t'90 (min) | 12.9 ± 3.1 | ASTM D 2084 |
| Other Product Features | Property | Typical Value | |
| | Specific gravity | 0.91 | |
| | Stabilizer type | Non-staining | |

[(1)]Monsanto Rheometer at 160° C., 1.7 Hz (100 cpm), 1 degree arc, micro-die
[(2)]Cure characteristics determined on ASTM D 3189 MIM mixed compound:

| | |
|---|---|
| TAKTENE 220 | 100 (parts by mass) |
| Zinc oxide | 3 |
| Stearic acid | 2 |
| IRB #6 black (N330) | 60 |
| Naphthenic oil | 15 |
| TBBS | 0.9 |
| Sulfur | 1.5 |

*This specification refers to product manufactured by Bayer Corp., Orange, Texas, U.S.A.

Concerning the elastomeric or rubber portion of the preferred embodiment compositions, it is preferred to utilize the previously described first and second polybutadienes in particular proportions to one another. Generally, it is preferred to utilize the first polybutadiene in a proportion of less than 50 parts per hundred parts of the total amount of the first and second polybutadienes. Unless indicated otherwise, all parts expressed herein are parts by weight. More preferably, the first polybutadiene is utilized in a proportion of about 45 parts or less (most preferably 40 parts or less) per hundred parts of the total amount of the first and second polybutadienes. With respect to the second polybutadiene, it is generally preferred to utilize the second polybutadiene in a proportion of more than 50 parts per hundred parts of the total amount of the first and second polybutadienes. More preferably, the second polybutadiene is utilized in a proportion of about 55 parts or more (most preferably 60 parts or more) per hundred parts of the total amount of the first and second polybutadienes.

The preferred embodiment core compositions of the present invention generally comprise from about 80 parts to about 120 parts by weight of elastomeric or rubber components, i.e. the first and second polybutadienes, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significant proportion of the rubber component. The rubber components include the previously described first and second polybutadienes. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate, is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix(buylperoxy)valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a peroxyketal manufactured and sold by Akzo Chemie America, Chicago, Ill. The one hour half life of Luperco 231 XL and Trigonox 29/40 is about 112° C., and the one hour half life of Luperco 230 XL and Trigonox 17/40 is about 129° C. Luperco 230 XL and Trigonox 17/40 are n-butyl-4,4-bis(t-butylperoxy)valerate and Luperco 231 XL and Trigonox 29/40 are 1, 1-di(t-butylperoxy)3,3, 5-trimethyl cyclohexane. Most preferably, and as noted in Table 6 herein, Trigonox 42-40B from Akzo Nobel of Chicago, Ill. is used. Most preferably, a solid form of this peroxide is used. Trigonox 42-40B is tert-Butyl peroxy-3,5,5-trimethylhexanoate. The liquid form of this agent is available from Akzo under the designation Trigonox 42S.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 10 parts by weight per 100 parts by weight of the rubbers (phr) component.

Moreover, filler-reinforcement agents may be added to the composition of the present invention. One such example is polypropylene powder. Since the specific gravity of polypropylene powder is very low, and when compounded, the polypropylene powder produces a lighter molded core, large amounts of higher gravity fillers may be added. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, zinc oxide, silica, mica, barytes, calcium carbonate, or clays. Limestone is ground calcium/magnesium carbonate and is used because it is an inexpensive, heavy filler. Other heavy filler include metal particles, such as powdered tungsten, bismuth, or molybdenum. Other filler materials are noted herein.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid, palmitic, oleic and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diisocyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

The golf ball core compositions of the invention may also comprise from about 1 to about 100 parts by weight of particulate polypropylene resin, and preferably from about 10 to about 100 parts by weight polypropylene powder resin, per 100 parts by weight of a base elastomer (or rubber) selected from polybutadiene and mixtures of polybutadiene with other elastomers. More preferably, the particulate polypropylene resin, if utilized in the core compositions of the present invention, comprises from about 20 to about 40 parts by weight of a polypropylene powder resin such as that trademarked and sold by Amoco Chemical Co. under the designation "6400 P", "7000P" and "7200 P". The ratios of the ingredients may vary and are best optimized empirically.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

Most preferably, a core formulation in accordance with the present invention is as follows in Table 6:

TABLE 6

| Ingredients | Parts | Wt % |
|---|---|---|
| Cariflex 1220x(BCP-820) | 40 | 24.64 |
| Neo Cis 60 | 30 | 18.48 |
| Neo Cis 40 | 30 | 18.48 |
| Zinc Oxide | 24 | 14.78 |
| Tungsten powder | 0.17 | 0.105 |
| Zinc Stearate | 16.3 | 10.04 |
| Zinc Diacrylate (ZDA) | 20.5 | 12.63 |

TABLE 6-continued

| Ingredients | Parts | Wt % |
|---|---|---|
| Red MB | 0.14 | 0.086 |
| Triganox 42-40B | 1.24 | 0.76 |
| Total | 162.4 | 100 |

In this preferred core formulation, it will be noted that the weight ratio of the polybutadiene formed from the cobalt catalyst (Cariflex BCP-820) to the polybutadiene formed from the neodymium catalyst (Neo Cis 60 and Neo Cis 40) is about 2:3. The present invention includes a wide range of such ratios, such as from 1:10 to 10:1. Preferably, the amount of the cobalt catalyst polybutadiene ranges from about 20% to about 30% of the core formulation. And, preferably, the amount of the neodymium catalyst polybutadiene ranges from about 30% to about 45% of the core formulation. Most preferably, these polybutadienes are in amounts of 25% and 37%, respectively.

It will be understood that the present invention golf balls may further include one or more interior or mantle layers. Such layers are usually disposed between the core and the cover components of the ball. It is also contemplated that the preferred blend of first and second polybutadienes described herein could be utilized in one or more of these interior mantle layers.

Figure 2:
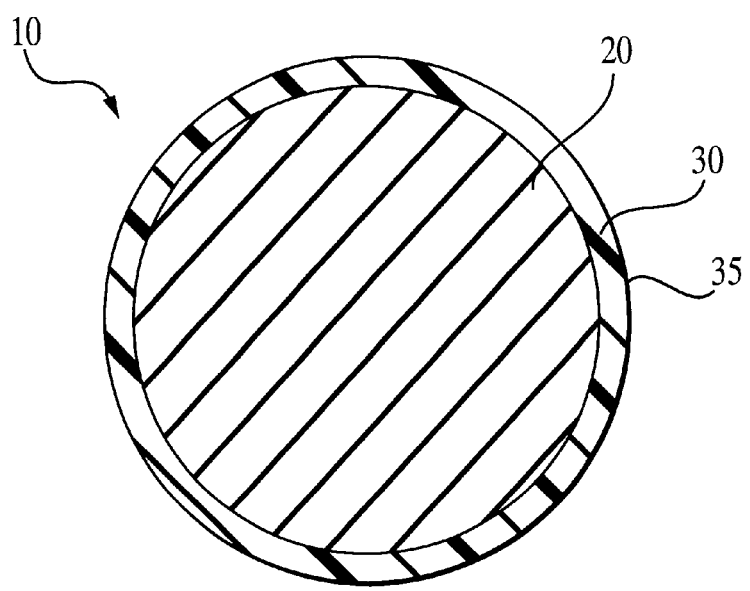
FIG. 2 is a cross sectional view of the first preferred embodiment golf ball.

The present invention is well suited for forming cores for golf balls as described herein. Referring to FIGS. 1 and 2, a first preferred embodiment golf ball 10 is illustrated. It will be understood that all figures are schematics and not necessarily to scale. The first preferred embodiment golf ball 10 comprises a core 20, most preferably as described herein, and a cover layer 30 disposed about the core 20. The core 30 includes an outer surface 35 that defines a plurality of dimples 40 along the outer surface 35 as is known in the art.

Figure 3:
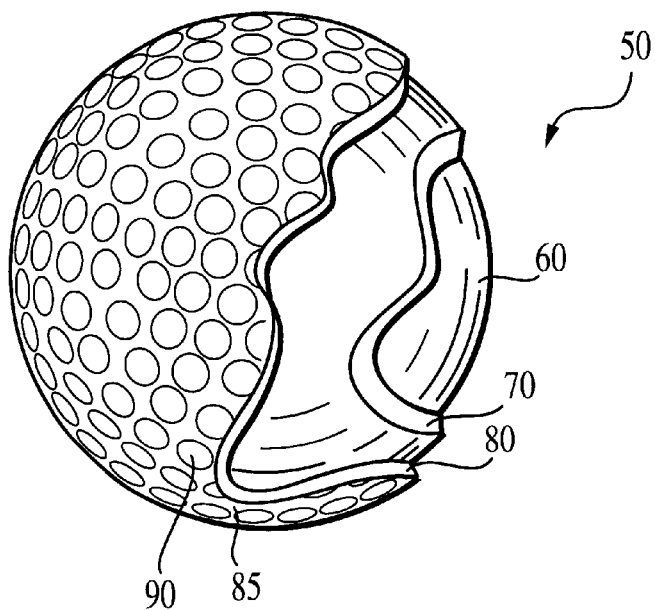
FIG. 3 is a partial sectional view of a second preferred embodiment golf ball in accordance with the present invention.
Figure 4:
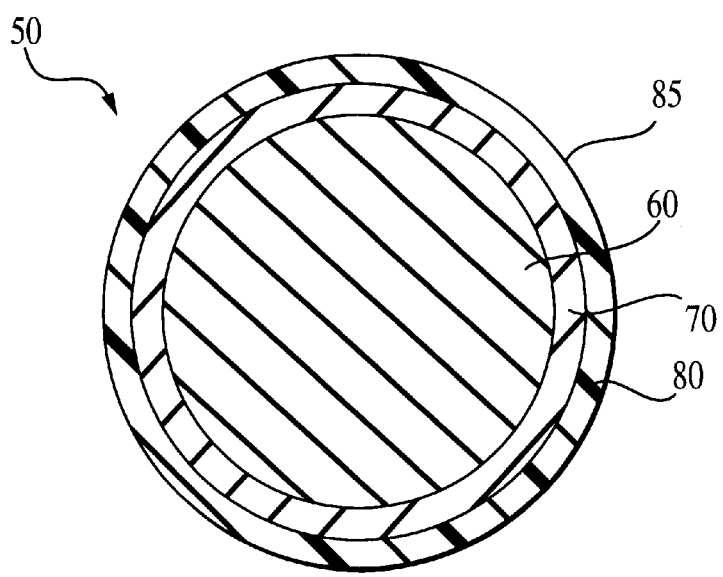
FIG. 4 is a cross sectional view of the second preferred embodiment golf ball.

The present invention core compositions are also well suited for use in multi-layer golf balls such as for example, a second preferred golf ball 50 illustrated in FIGS. 3 and 4. The second preferred embodiment golf ball 50 comprises a core 60, a first inner layer 70 disposed about the core 60, and an outer cover layer 80 disposed about the inner layer 70. The inner layer 70 may include one or more interior layers or mantles. The outer cover layer 80 may include one or more cover layers. The outer layer 80 includes an outer surface 85 that defines a plurality of dimples 90 as known in the art.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, powder resin, fillers, zinc salt, metal oxide, fatty acid, and any other optional components, if desired, are blended for about 7 minutes in an internal mixer such as a Banbury mixer. As a result of shear during mixing, the temperature rises to about 200° F., whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.050 to about 0.250 inch and preferably from about 0.060 to about 0.090 inch.

Covers

The cover layers can be formed over the cores by injection molding, compression molding, casting or other conventional molding techniques. Each layer preferably is separately formed. It is preferable to form each layer by either injection molding or compression molding. A more preferred method of making a golf ball of the invention with a multi-layer cover is to successively injection mold each layer in a separate mold. First, the inner cover layer is injection molded over the core in a smooth cavity mold, subsequently any intermediate cover layers are injection molded over the inner cover layer in a smooth cavity mold, and finally the outer cover layer is injection molded over the intermediate cover layers in a dimpled cavity mold.

The outer cover layer of the golf ball of the present invention is based on a resin material. Non-limiting examples of suitable materials are ionomers, plastomers such as metallocene catalyzed polyolefins, e.g., EXACT, ENGAGE, INSITE or AFFINITY which preferably are cross-linked, polyamides, amide-ester elastomers, graft copolymers of ionomer and polyamide such as CAPRON, ZYTEL, PEBAX, etc., blends containing cross-linked transpolyisoprene, thermoplastic block polyesters such as HYTREL, or thermoplastic or thermosetting polyurethanes, and polyureas such as ESTANE, which is thermoplastic.

Any inner cover layers which are part of the ball can be made of any of the materials listed in the previous paragraph as being useful for forming an outer cover layer. Furthermore, any inner cover layers can be formed from a number of other non-ionomeric thermoplastics and thermosets. For example, lower cost polyolefins and thermoplastic elastomers can be used. Non-limiting examples of suitable non-ionomeric polyolefin materials include low density polyethylene, linear low density polyethylene, high density polyethylene, polypropylene, rubber-toughened olefin polymers, acid copolymers which do not become part of an ionomeric copolymer when used in the inner cover layer, such as PRIMACOR, NUCREL, ESCOR and ATX, flexomers, thermoplastic elastomers such as styrene/butadiene/styrene (SBS) or styrene/ethylene-butylene/styrene (SEBS) block copolymers, including Kraton (Shell), dynamically vulcanized elastomers such as Santoprene (Monsanto), ethylene vinyl acetates such as Elvax (DuPont), ethylene methyl acrylates such as Optema (Exxon), polyvinyl chloride resins, and other elastomeric materials may be used. Mixtures, blends, or alloys involving the materials described above can be used. It is desirable that the material used for the inner cover layer be a tough, low density material. The non-ionomeric materials can be mixed with ionomers.

The outer cover layer and any inner cover layers optionally may include processing aids, release agents and/or diluents. Another useful material for any inner cover layer or layers is a natural rubber latex (prevulcanized) which has a tensile strength of 4,000–5,000 psi, high resilience, good scuff resistance, a Shore D hardness of less than 15 and an elongation of 500%.

When the ball has a single cover layer, it has a thickness of 0.010–0.500 inches, preferably 0.015–0.200 inches, and more preferably 0.025–0.150 inches. When the ball has two or more cover layers, the outer cover layer typically has a thickness of 0.01–0.20 inches, preferably 0.02–0.20 inches, and more preferably 0.025–0.15 inches. The one or more inner cover layers have thicknesses appropriate to result in an overall cover thickness of 0.03–0.50 inches, preferably 0.05–0.30 inches and more preferably 0.10–0.20 inches, with the minimum thickness of any single inner cover layer preferably being 0.01 inches.

The core and/or cover layers of the golf ball optionally can include fillers to adjust, for example, flex modulus, density, mold release, and/or melt flow index. A description of suitable fillers is provided below in the "Definitions" section.

The physical characteristics of the cover are such that the ball has a soft feel. When a single cover layer is used, the Shore D hardness of that cover layer is at least 60 in one preferred form of the invention. When the ball has a multi-layer cover, the Shore D hardness of the outer cover layer is at least 60 in another preferred form of the invention. Preferably, the outer cover layer in a single or multi-layer covered ball has a Shore D hardness of at least 63, more preferably at least 65, and most preferably at least 67. The preferred maximum Shore D hardness for the outer cover layer is 90.

A particularly preferred embodiment of an outer cover layer for use in forming the golf ball of the present invention incorporates high molecular weight ionomer resins, such as EX 1005, 1006, 1007, 1008 and 1009, provided by Exxon Chem. Co., or any combination thereof, as shown in Table 7. These resins are particularly useful in forming the outer cover layer because they have a tensile modulus/hardness ratio that allows for a hard cover over a soft core while maintaining durability.

TABLE 7

Examples of Exxon High Molecular Weight Ionomers

| PROPERTY | Ex 1006 | Ex 1006 | Ex 1007 | Ex 1008 | Ex 1009 | 7310 |
|---|---|---|---|---|---|---|
| Melt Index, g/10 min. | 0.7 | 1.3 | 1.0 | 1.4 | 0.8 | 1.0 |
| Cation | Na | Na | Zn | Zn | Na | Zn |
| Melting Point, °C. | 85.3 | 86 | 85.8 | 86 | 91.3 | 91 |
| Vicat Softening Point, °C. | 54 | 57 | 60.5 | 60 | 56 | 69 |
| Tensile @ Break, MPa | 33.9 | 33.5 | 24.1 | 23.6 | 32.4 | 24 |
| Elongation @ Break, % | 403 | 421 | 472 | 427 | 473 | 520 |
| Hardness, Shore D | 58 | 58 | 51 | 50 | 56 | 52 |
| Flexural Modulus, MPa | 289 | 290 | 152 | 141 | 282 | 150 |

Appropriate fillers or additive materials may also be added to produce the cover compositions of the present invention. These additive materials include dyes (for example, Ultramarine Blue sold by Whitaker, Clark and Daniels of South Plainfield, N.J.), and pigments, i.e., white pigments such as titanium dioxide (for example UNITANE 0-110 commercially available from Kemira, Savannah, Ga.) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on weight of the base ionomer mixture. The most preferred pigment for use in accordance with this invention is titanium dioxide (Anatase).

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), commercially available from Flexysys, Akron, Ohio, antistatic agents, stabilizers, compatablizers and processing aids. The cover compositions of the present invention may also contain softening agents, such as plasticizers, etc., and reinforcing materials, as long as the desired properties produced by the golf ball covers of the invention are not impaired.

Furthermore, optical brighteners, such as those disclosed in U.S. Pat. No. 4,679,795 may also be included in the cover composition of the invention. Examples of suitable optical brighteners which can be used in accordance with this invention are Uvitex OB as sold by the Ciba-Geigy Chemical Company, Ardsley, N.Y. Uvitex OB is believed to be 2,5-Bis(5-tert-butyl-2-benzoxazoyl)-thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol(1,2-d)-triazol-2yl(3phenyl-coumarin. Phorwhite K-20G2 is sold by Mobay Chemical Corporation, P.O. Box 385, Union Metro Park, Union, N.J. 07083, and is thought to be a pyrazoline derivative. Eastobrite OB-1 as sold by Eastman Chemical Products, Inc., Kingsport, Tenn. is thought to be 4,4-Bis(-benzoxaczoyl) stilbene. The above-mentioned UVITEX and EASTO-BRITE OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.20% depending on the optical properties of the particular optical brightener used and the polymeric environment in which it is a part.

Generally, the additives are admixed with an ionomer to be used in the cover composition to provide a masterbatch (abbreviated herein as MB) of desired concentration and an amount of the masterbatch sufficient to provide the desired amounts of additive is then admixed with the copolymer blends.

Most preferably, the preferred embodiment golf balls of the present invention utilize a particular cover composition in combination with a core having a particular set of physical properties. The formulation of this most preferred core is set forth in Table 6. This most preferred golf ball is as follows in Tables 8A and 8B set forth below.

TABLE 8A

| Core Data | |
|---|---|
| Size | 1.56" +/− 0.005 |
| Weight | 38.0g +/− 0.004 |
| Riehle Comp | 113 +/− 9 |
| COR | 0.780 +/− 0.010 |
| Specific Gravity | 1.16 |
| JIS C | 73 +/− 1 |
| Shore C | 75 +/− 2 |
| Shore D | 44 +/− 1 |

| Final Ball Data | Wt % |
|---|---|
| Cover Composition | |
| Iotek 1006/8610 (Na) | 45.15 |
| Surlyn 8552/6120 (Mg) | 45.15 |
| Iotek 7030 (Zn) | 9.7 |
| Whitener Package | 3.1 phr |
| Flex Modulus (weighted avg) | 379 MPa |
| Cover Specific Gravity | 0.98 +/−0.01 |
| Size | 1.685" +/− 0.005 |
| Weight | 45.4 g +/− 0.4 |
| Riehle Comp | 95 +/− 5 |
| COR | 0.806 +/− 0.009 |
| JIS C | 95 +/− 1 |
| Shore C | 97 +/− 1 |
| Shore D | 69 +/− 1 |

TABLE 8B

Ionomers in Cover

Individual Ionomers

|  | Iotek 1006/8610 | Surlyn 8552/6120 | Iotek 7030 |
|---|---|---|---|
| % Acid/Type[1] | 15% AA | 19% MA | 15% AA |
| Ionomer Type | Copolymer | Copolymer | Copolymer |
| Cation | Na | Mg | Zn |
| Melt Index | 1.3 | 1.3 | 2.5 |
| Stiffness Modulus[2] | 2719 Kgf/cm$^2$ | 3499 Kgf/cm$^2$ | 1840 Kgf/cm$^2$ |
| Flex Modulus | 290 MPa | 517 MPa | 155 MPa |

[1]AA = Acrylic Acid, MA = Methacrylic Acid
[2]>Stiffness measurements done using Toyoseiki Stiffness Tester Details of the individual components of this most preferred cover composition are set forth below in Tables 9A–9C.

TABLE 9A

Iotek 8610
Ethylene Acrylic Acid Sodium Ionomer

Description

Iotek 8610 is a low melt index sodium ionomer made from an ethylene acrylic acid base polymer. It is designed to have high durability, resilience and impact strength.

| Resin Properties | ASTM Method | Units (SI) | Typical Value[1] |
|---|---|---|---|
| Melt Index | D-12383 | g/10 min. | 1.3 |
| Cation | Exxon Method | — | Na |
| Density | D-1505 | g/cm$^3$ | 0.951 |
| Melting Point | D-3417 | ° F.(° C.) | 187 (86) |
| Physical Properties[2] | | | |
| Tensile Strength @ Break | D-638 | psi (MPa) | 4930 (34) |
| Ultimate Elongation | D-638 | % | 420 |
| Flexural Modulus, 1% Secant | D-790 | psi (MPa) | 42,000 (290) |
| Vicat Softening Point | D-1525 (Rate B) | ° F. (° C.) | 135 (57) |
| Hardness Shore D | D-2240 | — | 58 |

[1]Values given above are typical.
[2]Tensile testing was performed on Type IV compression molded specimens.
[3]Run at 190° C. with 2.16 kg load.

TABLE 9B

Surlyn ™ 6120 Resin

Description
Surlyn ™ 6120 is a magnesium ionomer that provides good toughness, high stiffness and durability. It is positioned in the high acid, medium neutralization area of the ionomer spectrum.

| Typical Properties of Surlyn ™ 6120 | Units | ASTM Method | Surlyn 6120 |
|---|---|---|---|
| General | | | |
| Cation Type | | | Mg |
| Melt Flow Index | g/10 min | D-1238 | 1.3 |
| Specific Gravity | | D-792 | 0.95 |
| Mechanical | | | |
| Tensile Strength | kpsi (MPa) | D-638 | 5.2 (35.9) |
| Yield Strength | kpsi (MPa) | D-638 | 2.9 (20.0) |
| Elongation | % | D-638 | 270 |
| Hardness | D | D-2240 | 67 |
| Flexural Modulus | kpsi (MPa) | D-790 (B) | 75 (517) |
| Thermal | | | |
| Melt Point | ° F. (° C.) | D-3418 (DSC) | 185 (85) |
| Freeze Point | ° F. (° C.) | D-3418 (DSC) | 102 (39) |
| Vicat Softening Point | ° F. (° C.) | D-1525 | 140 (60) |

TABLE 9C

Iotek 7030

| Physical Property | Test Method | Unit | Typical Value |
|---|---|---|---|
| Melt Index | ASTM D 1238 | g/10 min | 2.5 |
| Density | ASTM D 1505 | kg/m$^3$ | 964 |
| Cation type | | | zinc |
| Melting point (DSC) | ASTM D 3417 | ° C. | 85 |
| Crystallization point (DSC) | ASTM D 3417 | ° C. | 58 |
| Plaque properties (2 mm thickness, compression molded) | | | |
| Tensile strength at break | ASTM D 638 | MPa | 22.6 |
| Yield strength | ASTM D 638 | MPa | 12 |
| Elongation at break | ASTM D 638 | % | 460 |
| 1% secant modulus | ASTM D 638 | MPa | 125 |
| Vicat softening point | ASTM D 1525 | ° C. | 60 |
| Hardness Shore D | ASTM D 2240 | | 52 |
| Abrasion resistance (weight loss) | ASTM D 1242 | mg | 25 |
| Tensile Impact at 23° C. | ASTM D 1822 | kJ/m$^2$ | 480 |
| at −40° C. | | | 340 |
| Flexural modulus (3 mm) | ASTM D 790 | MPa | 155 |
| De Mattia flex resistance | ASTM D 430 | Cycles | >5000 |
| Zwick rebound | DIN 53512 | % | 40 |

It will be noted that this most preferred cover formulation includes the combination of a sodium ionomer, a magnesium ionomer, and a zinc ionomer. The amounts of each of these may be tailored as desired, however the preferred amounts are as followed. The sodium ionomer is preferably employed within the range of from about 40% to about 50% of the cover formulation, and most preferably at about 45%. The magnesium ionomer is preferably used within the range of from about 40% to about 50% of the cover formulation, and most preferably at about 45%. The zinc ionomer is preferably used within the range of from about 5% to about 15%, and most preferably at about 10%.

The golf ball of the present invention preferably has a mechanical impedance with a primary minimum value in the frequency range of 3100 Hz or less, and preferably 100–3100 Hz. This low mechanical impedance provides the ball with a soft feel. This soft feel in combination with excellent distance provide a golf ball which is particularly well suited for use by intermediate players who like a soft ball but desire a greater distance than can be achieved with a conventional balata ball.

Mechanical impedance is defined as the ratio of magnitude and force acting at a particular point to a magnitude of a responsive velocity at another point when the force is acted. Stated another way, mechanical impedance Z is given by Z=F/V, where F is an externally applied force and V is a responsive velocity of the object to which the force is applied. The velocity V is the internal velocity of the object.

Mechanical impedance and natural frequency can be depicted graphically by plotting impedance on the "Y" axis and frequency N (Hz) on the "X" axis. A graph of this type is shown in FIGS. 14–21.

Figure 14:
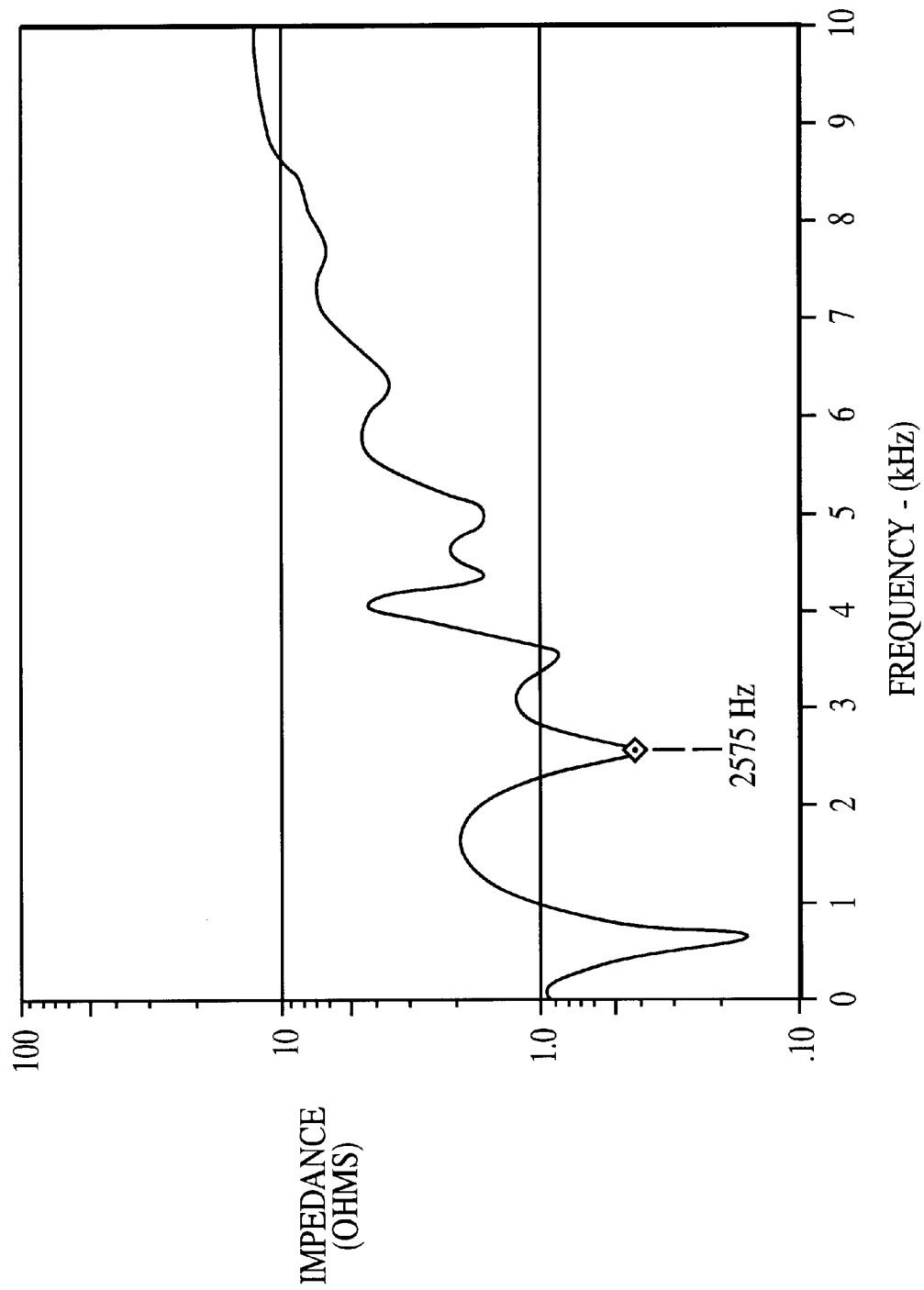
FIGS. 14–21 are graphs showing mechanical impedance for the golf balls tested in Example 4.
Figure 15:
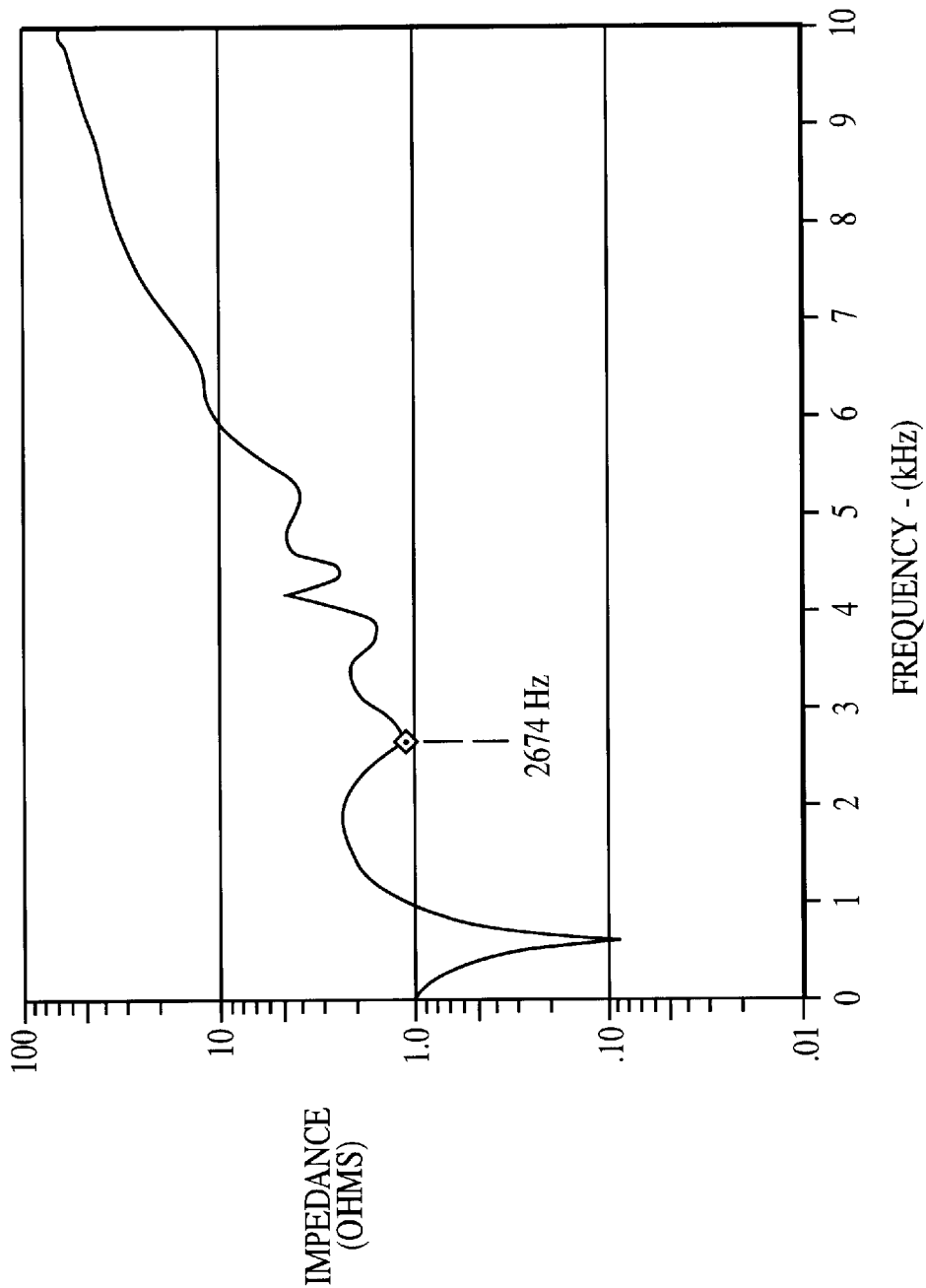
Figure 16:
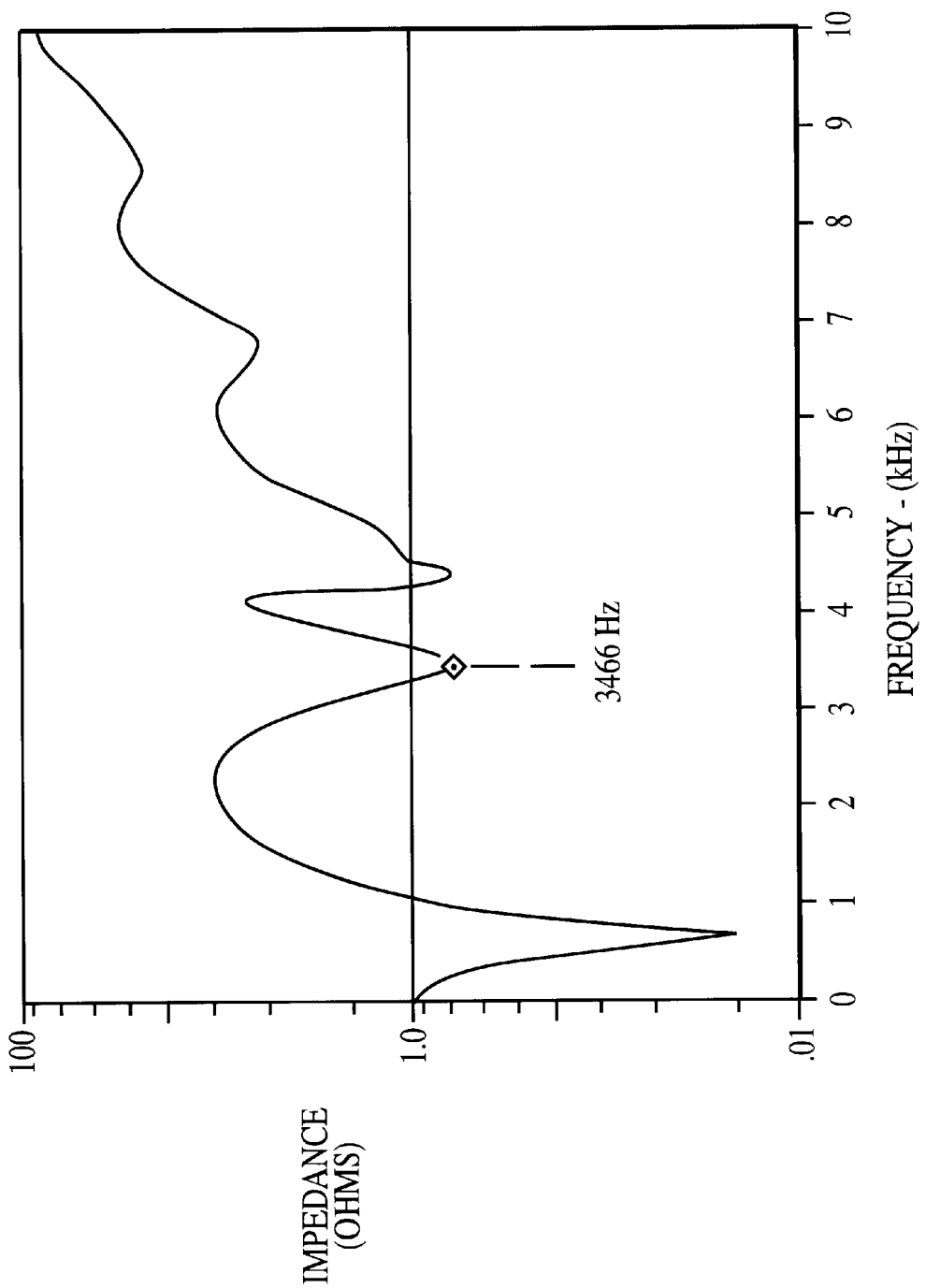
Figure 17:
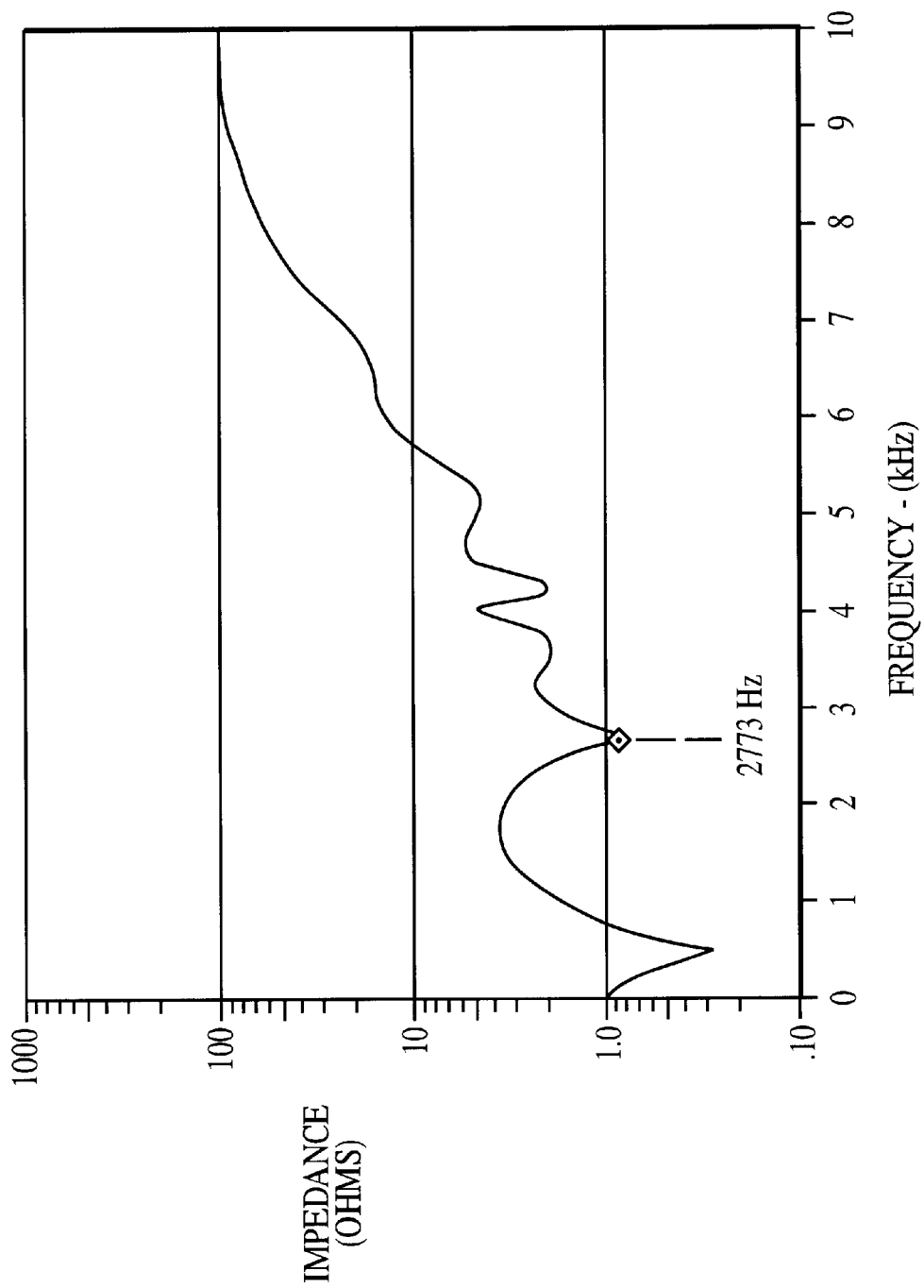
Figure 18:
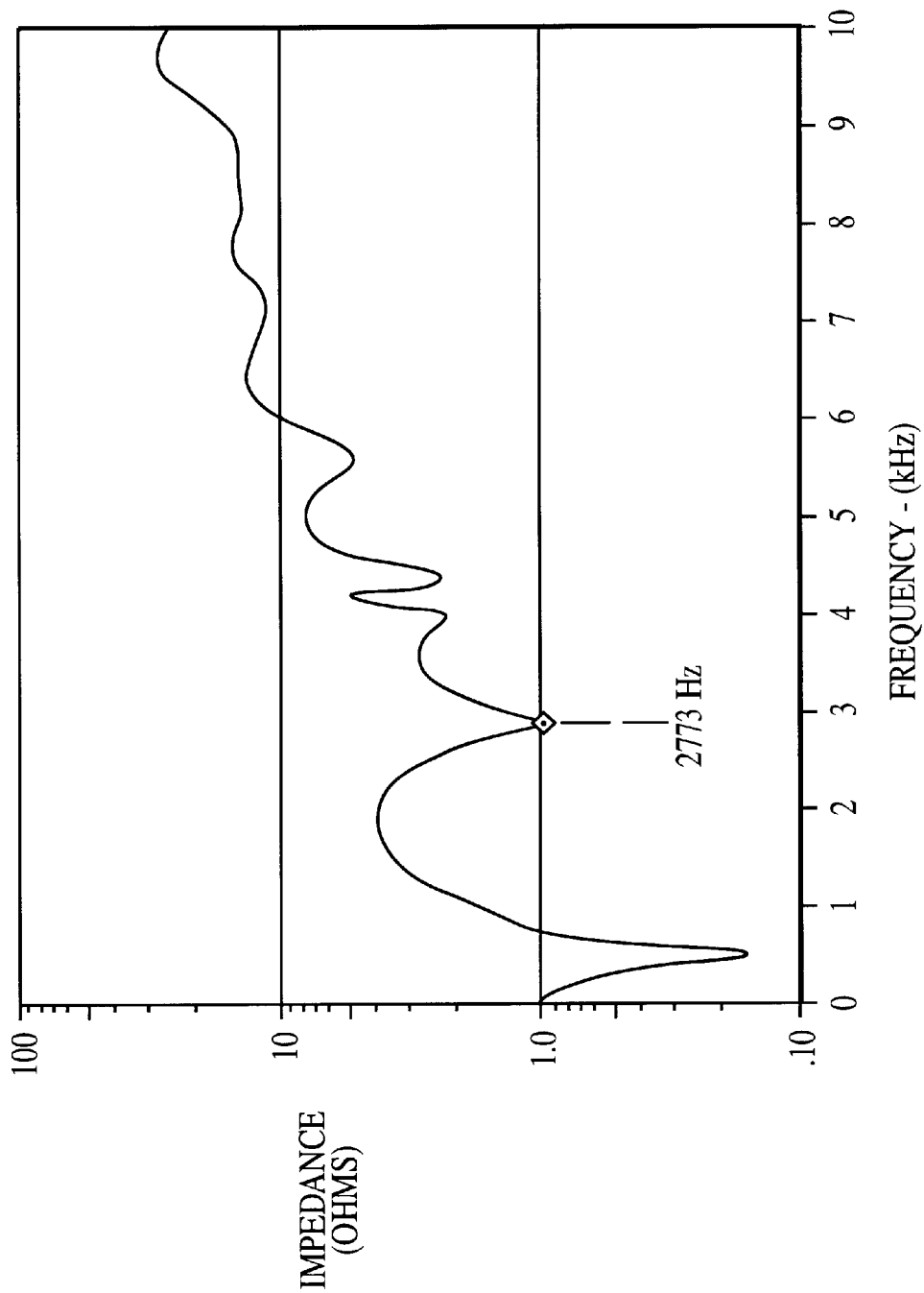
Figure 19:
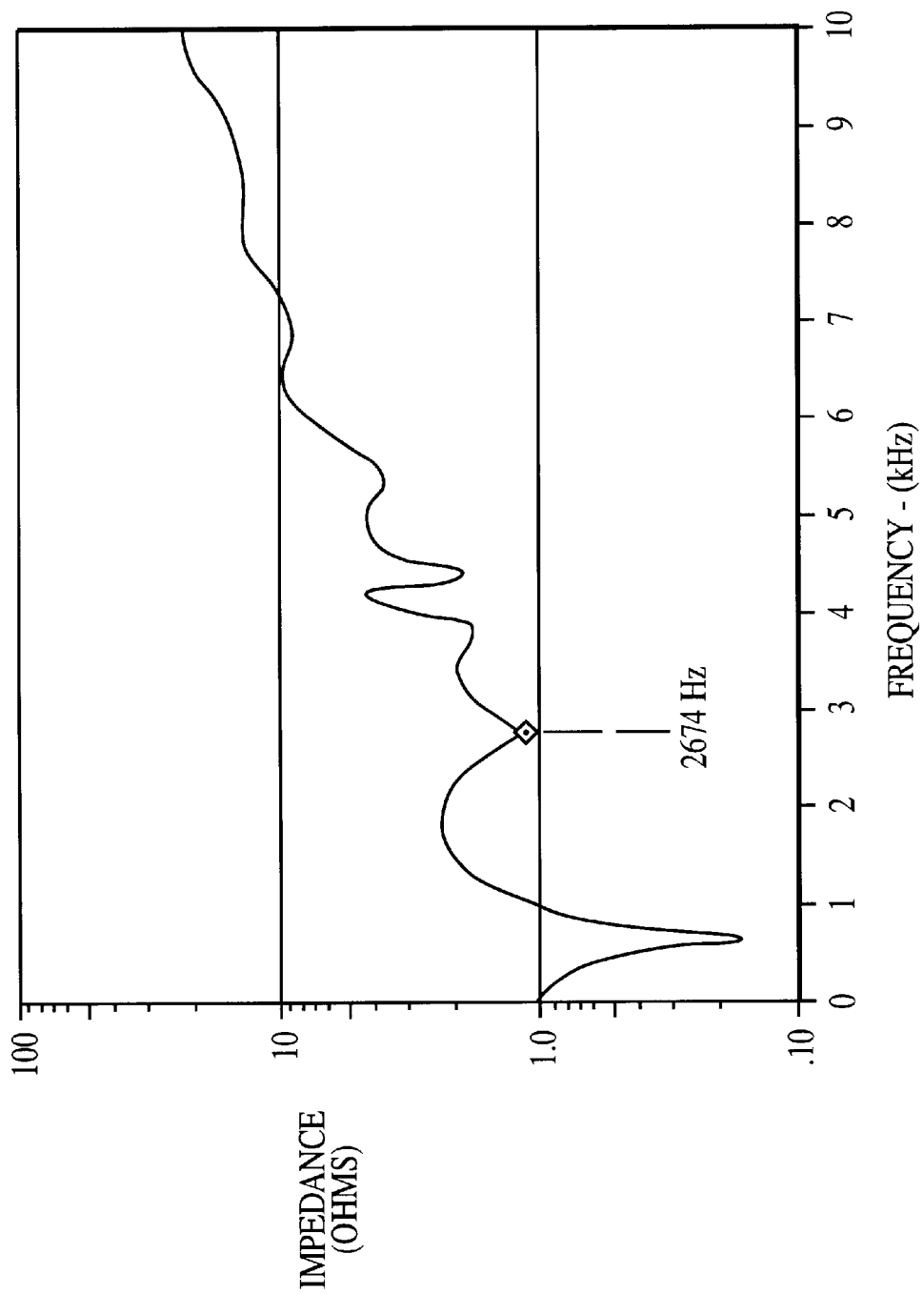
Figure 20:
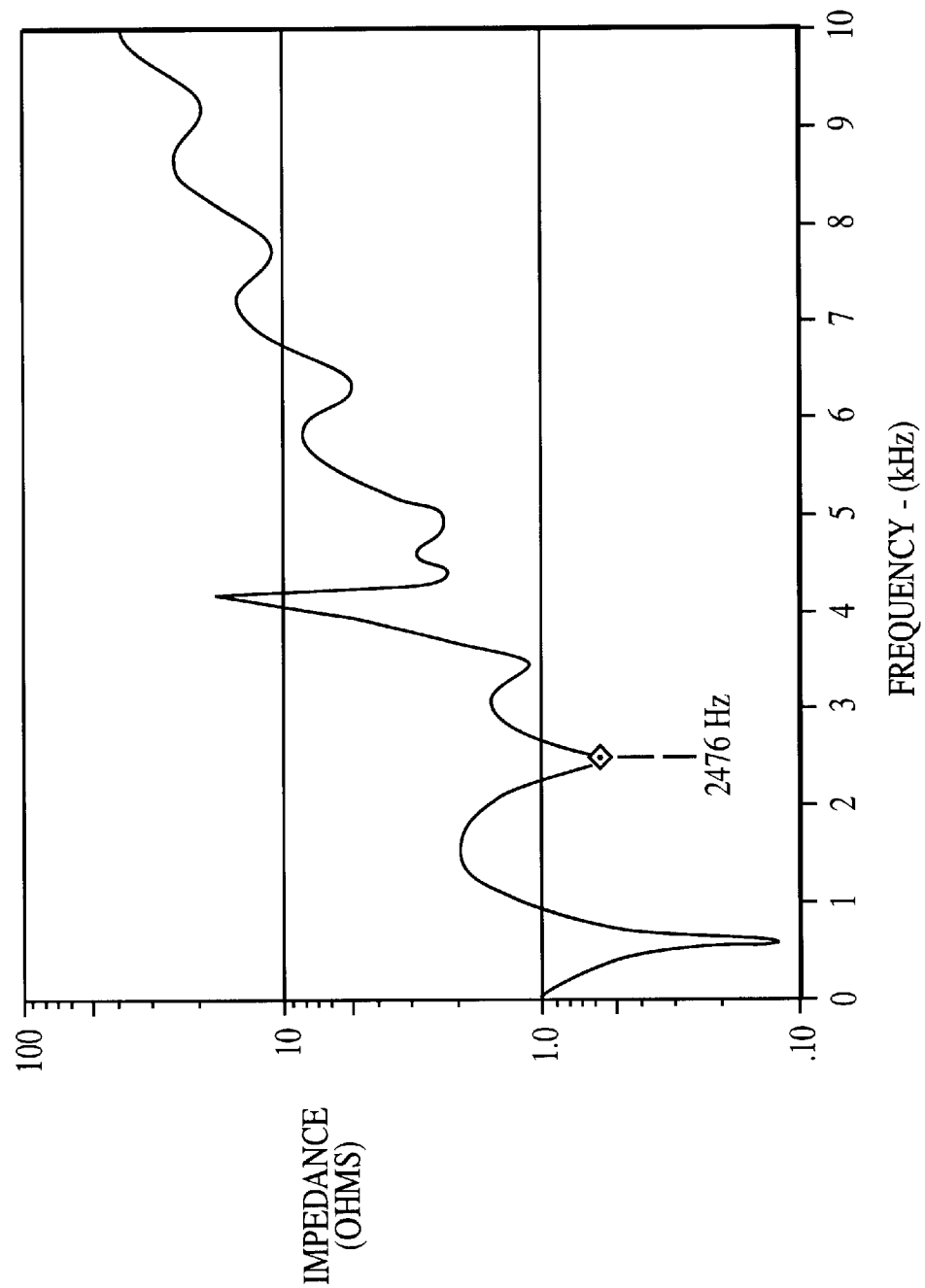
Figure 21:
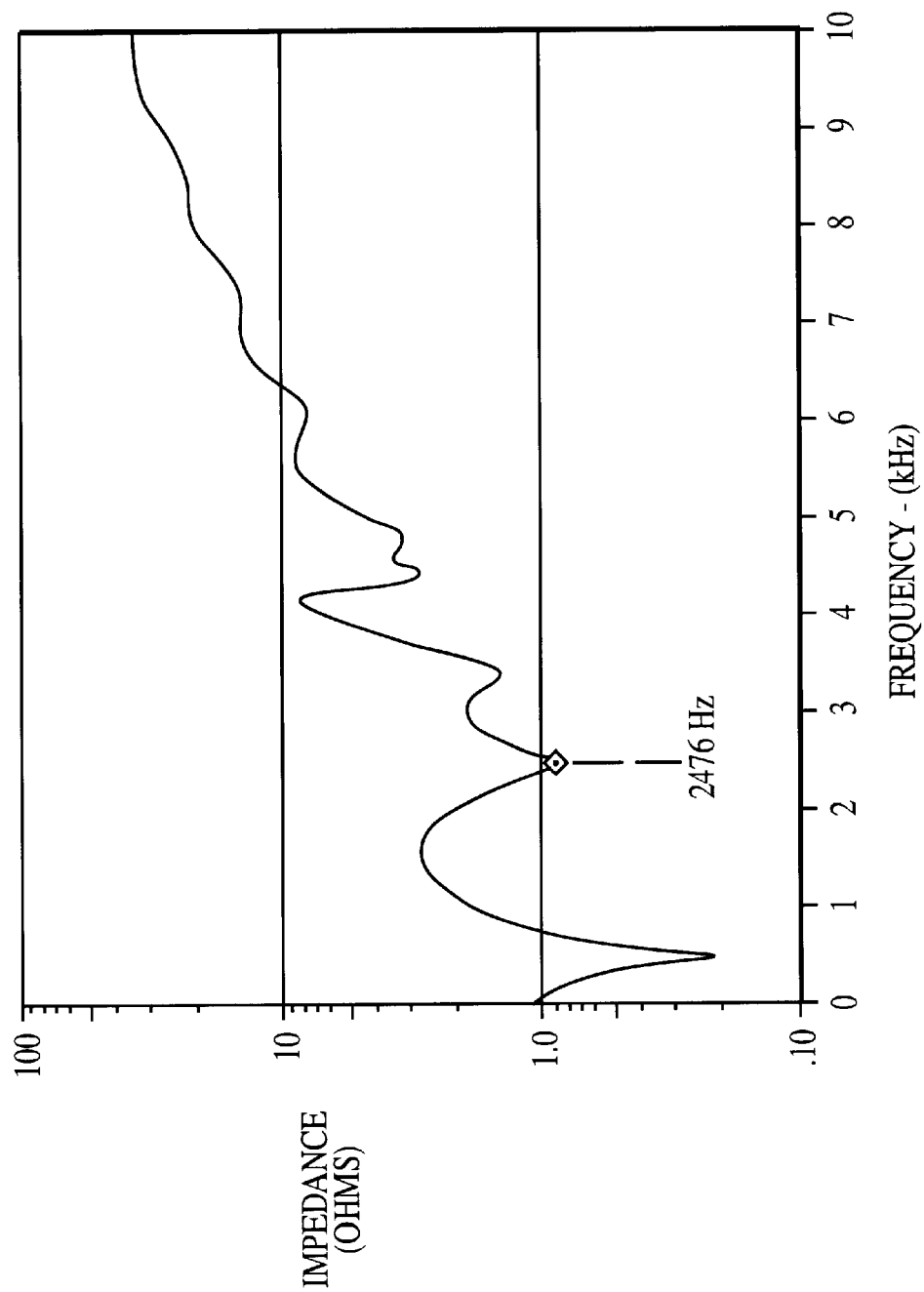

As shown in FIG. 14, a golf ball of Example 2 which is analyzed in Example 4 has a mechanical impedance with a primary minimum value at a first frequency, a mechanical impedance with a secondary minimum value at a higher frequency, and a third minimum value at an even higher frequency. These are known as the primary, secondary and tertiary minimum frequencies. The first minimum value which appears on the graph is not the primary minimum frequency of the ball but instead represents the forced node resonance of the ball due to the introduction of an artificial node, such as a golf club. The forced node resonance is a frequency which may depend in part upon the nature of the artificial node. The existence of forced node resonance is analogous to the change in frequency which is obtained on a guitar by placing a finger over a fret.

The mechanical impedance can be measured using an accelerometer. Further details regarding natural frequency determinations are provided below in the Examples.

Figure 5:
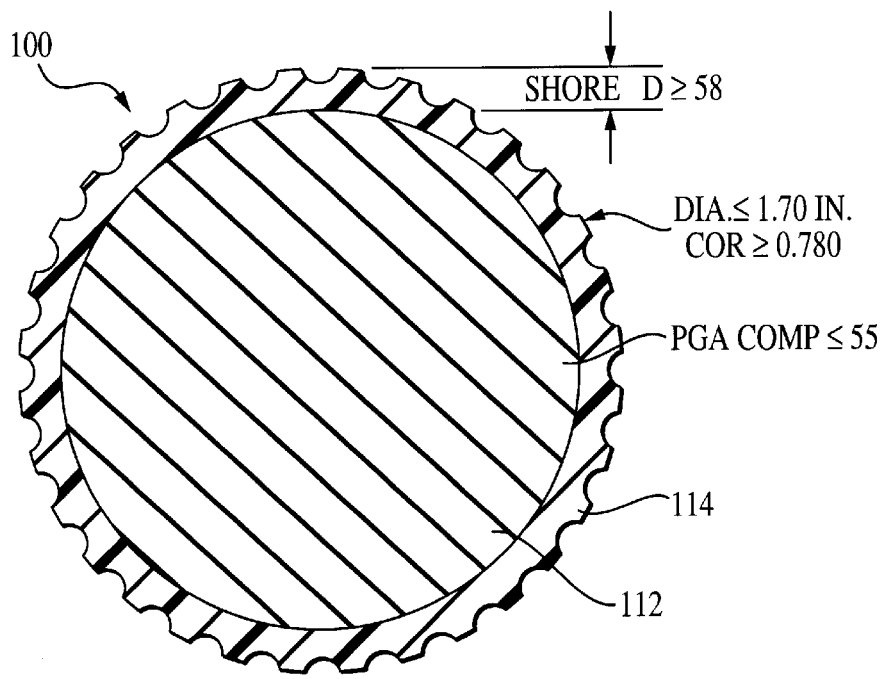
FIG. 5 is a cross-sectional view of a third preferred embodiment golf ball according to the present invention having a unitary, solid core and a single cover layer.

Referring to FIG. 5, a third embodiment of a golf ball according to present invention is shown and is designated as 110. The ball includes a central core 112 formed from polybutadiene or another cross-linked rubber. A cover layer 114 surrounds the core. The core has a PGA compression of 55 or less. The cover has a Shore D hardness of at least 60. The ball has a PGA compression of 80 or less.

Figure 6:
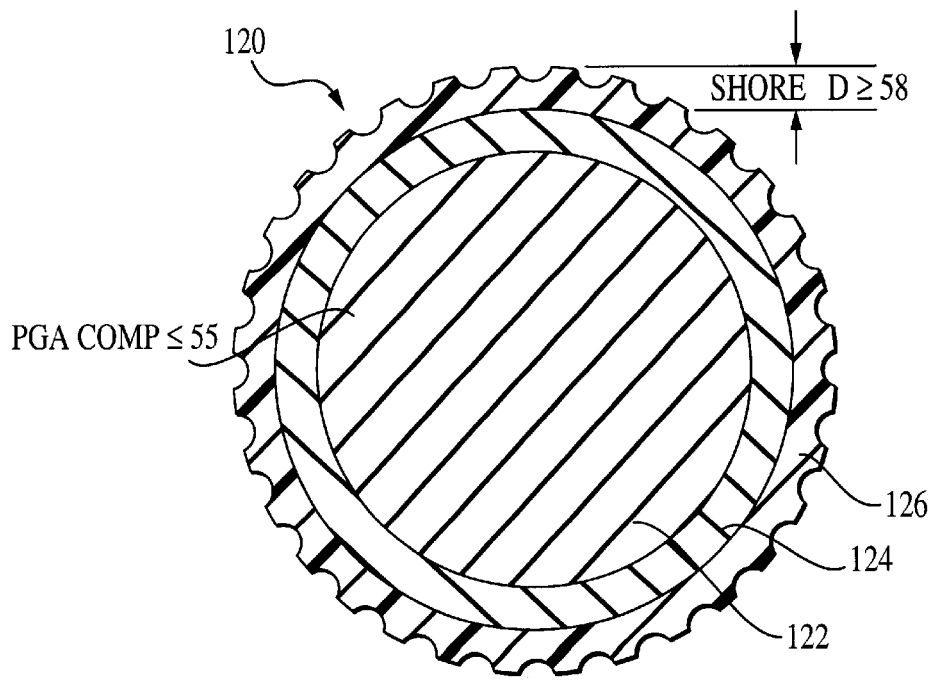
FIG. 6 is a cross-sectional view of a fourth preferred embodiment of the invention in which the ball has two cover layers.

Referring now to FIG. 6, a cross-sectional view of a fourth embodiment of the invention is shown, and is designated as 120. The ball 120 has a solid core 122, an inner cover layer 124, and an outer cover layer 126. The core has a PGA compression of 55 or less. The outer cover layer has a Shore D hardness of 60 or more. The inner cover layer can be softer or harder than the outer cover layer, but provides the overall ball with a PGA compression of 80 or less.

Figure 7:
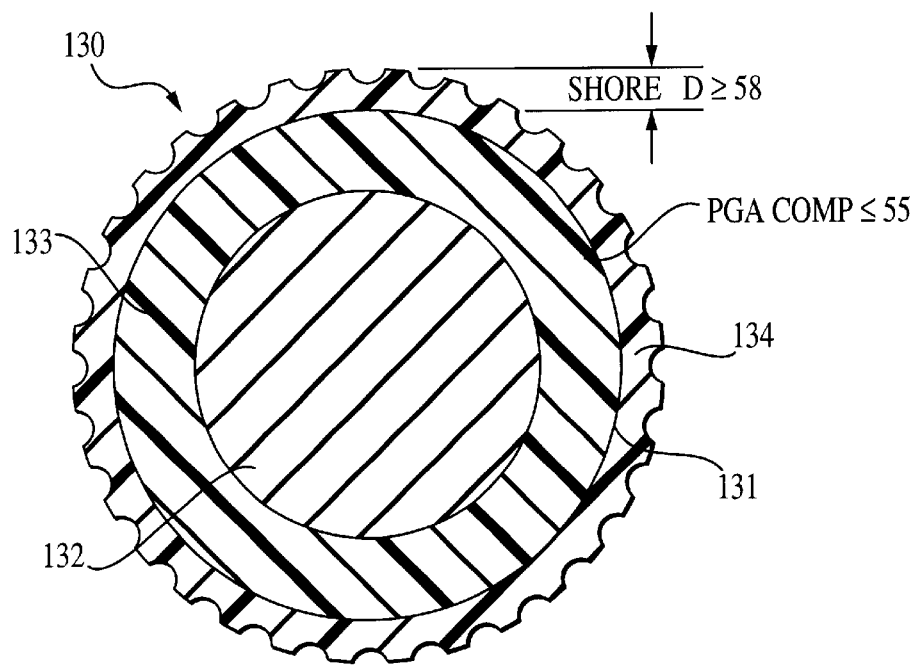
FIG. 7 is a cross-sectional view of a fifth embodiment of a golf ball according to the present invention in which the ball has a dual layer solid core.

A fifth embodiment of a golf ball according to the present invention is shown in FIG. 7, and is designated as 130. The ball includes a solid core 131 which is formed from two layers, namely, an inner core layer 132 and an outer core layer 133. A cover 134 surrounds the core 131. The inner core layer 132 and outer core layer 133 are selected to provide the overall core 131 with a PGA compression of 55 or less. The inner core layer may be harder or softer than the outer core layer and may also be higher in durability. The cover has a Shore D hardness of at least 60. The ball has a PGA compression of 80 or less.

Figure 8:
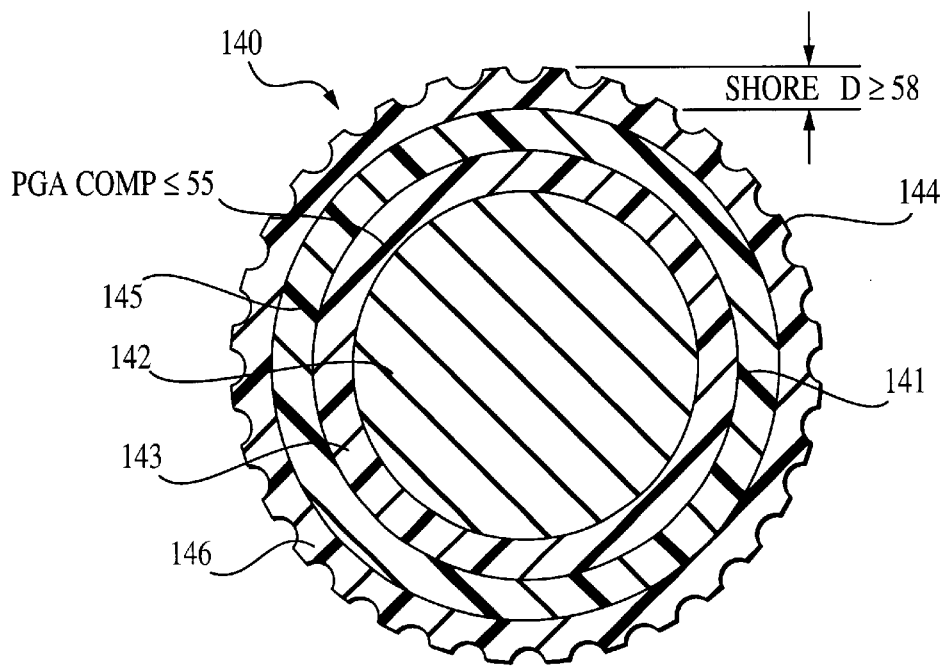
FIG. 8 is a cross-sectional view of a sixth embodiment of the present invention in which the ball has a dual layer solid core and a dual layer cover.

FIG. 8 shows a cross-sectional view of a sixth embodiment of a golf ball according to the present invention, which is designated as 140. The ball includes a core 141 having an inner core layer 142 and an outer core layer 143. A dual layer cover 144 surrounds the core 141. The dual layer cover 144 includes an inner cover layer 145 and an outer cover layer 146. The core 141 has a PGA compression of 55 or less. The outer cover layer 146 has a Shore D hardness of 60 or more. The ball has a PGA compression of 80 or less.

Figure 9:
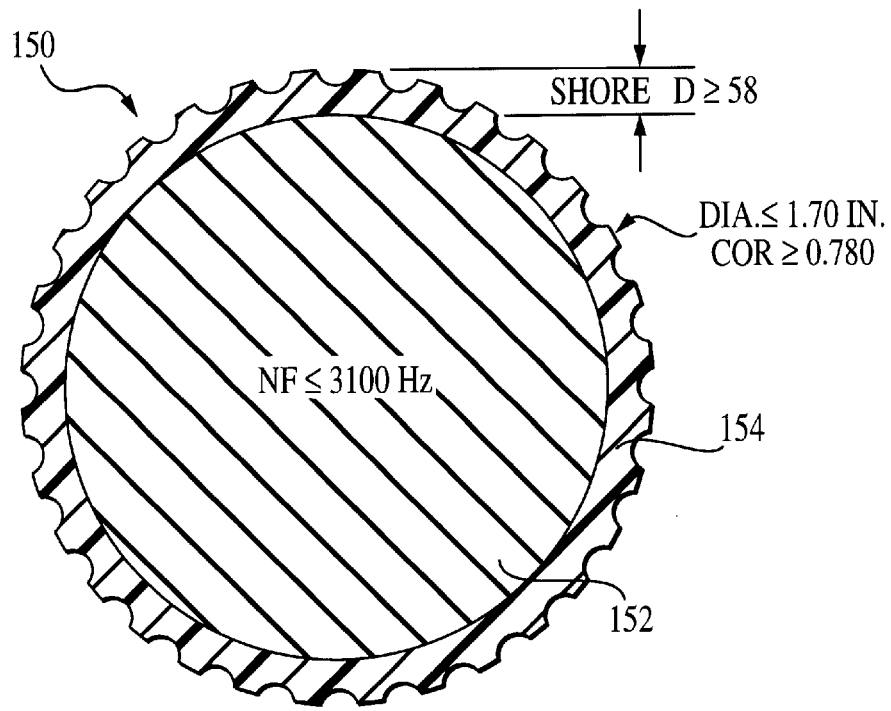
FIG. 9 is a cross-sectional view of an embodiment of the invention in which the ball has a mechanical impedance with a primary minimum value in a particular frequency range.

FIG. 9 shows yet another preferred embodiment of the present invention, which is designated as 150. The ball 150 has a core 152 formed from one or more layers and a cover 54 formed from one or more layers. The ball is constructed such that the outer cover layer has a Shore D hardness of at least 60, and the ball has a mechanical impedance with a primary minimum value in the frequency range of 3100 Hz, after the ball has been maintained at 21.1° C., 1 atm. and about 50% relative humidity for at least 15 hours.

Figure 10:
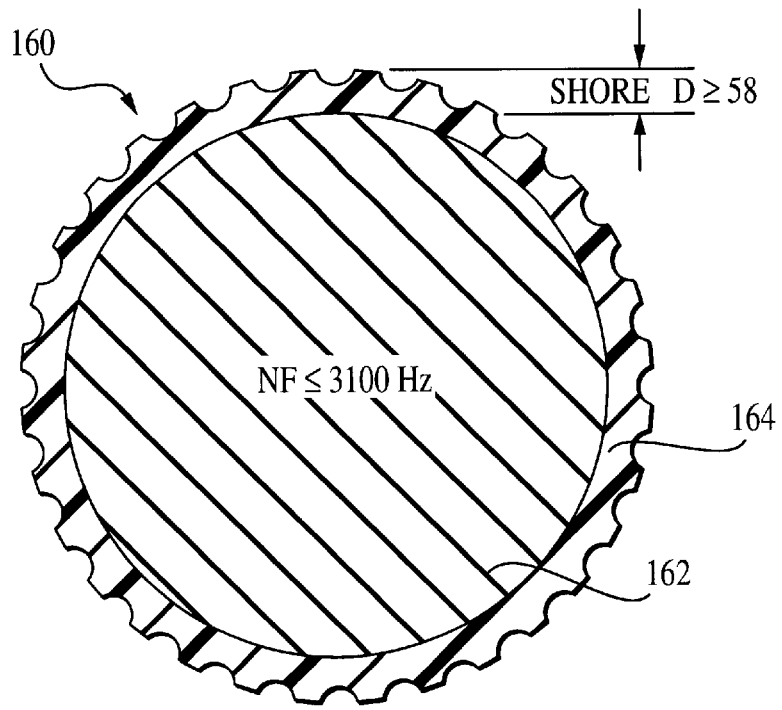
FIG. 10 is a cross-sectional view of a solid golf ball according to the invention in which the ball has a particular PGA core compression and a mechanical impedance with a primary minimum value in a particular frequency range.

Yet another embodiment of a golf ball according to the invention is shown in FIG. 10 and is designated as 160. The ball has a solid core 162 and a cover 164, each of which can be formed of one or more layers. The core 162 has a PGA compression of 55 or less and the cover has a Shore D hardness of at least 58. The ball has a mechanical impedance with a primary minimum value in the frequency range of 3100 Hz or less after the ball has been maintained at 21.1° C., 1 atm. and about 50% relative humidity for at least 15 hours.

Figure 11:
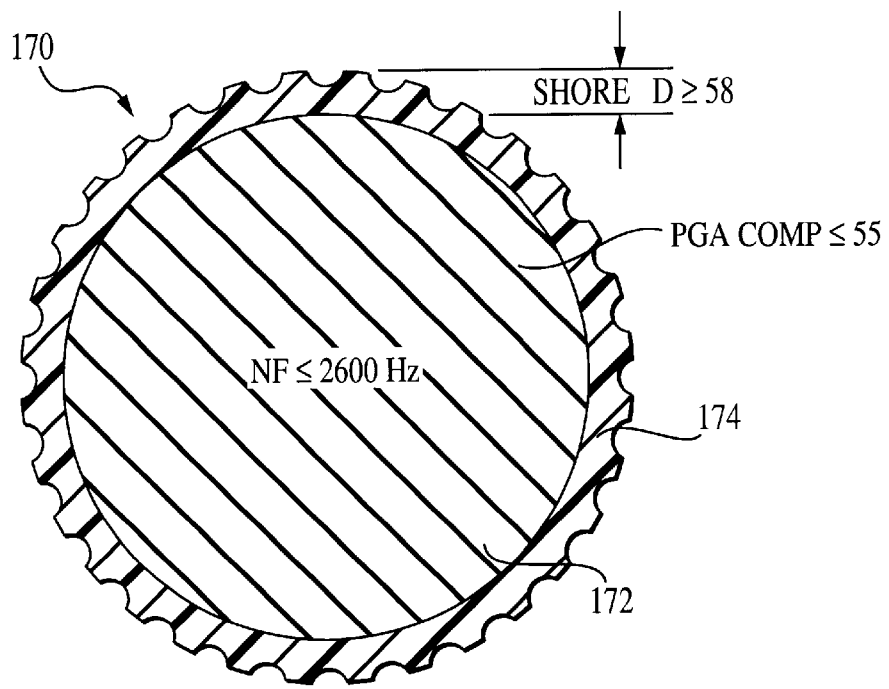
FIG. 11 shows a cross-sectional view of a golf ball according to yet another embodiment of the invention.

Yet another embodiment of a golf ball according to the invention is shown in FIG. 11. The ball 170 includes a solid or wound core 172 and a cover 174. Each of the core and cover can have one or more layers. The outer cover layer of the ball has a Shore D hardness of at least 60. The ball has a mechanical impedance with a primary minimum value in the frequency range of 2600 or less after the ball has been maintained at 21.1, 1 atm. and about 50% relative humidity for at least 15 hours.

Figure 12:
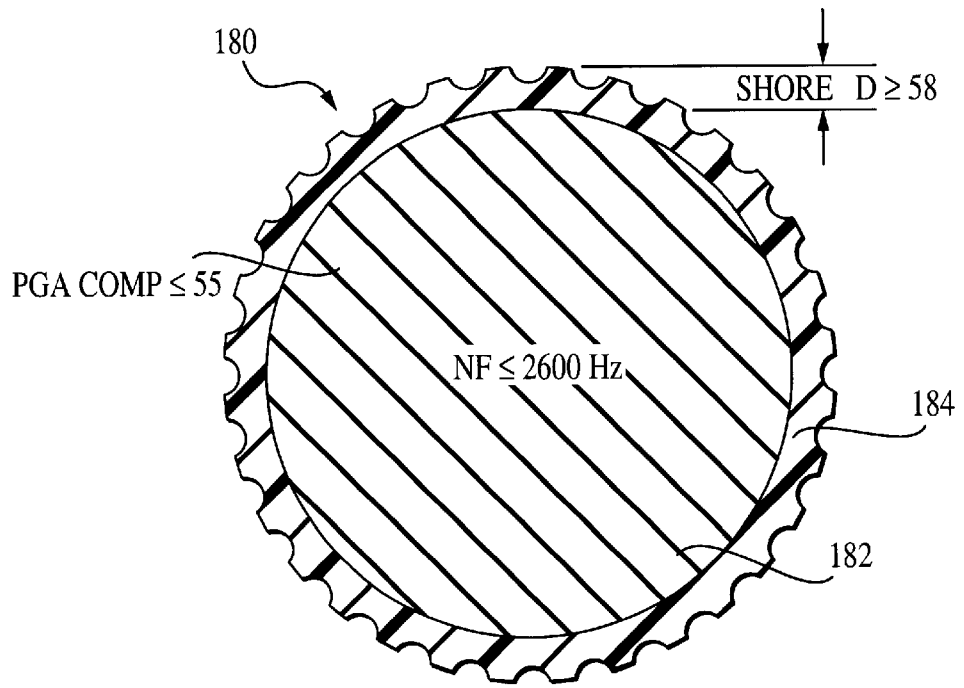
FIG. 12 shows a cross-sectional view of a golf ball according to a further embodiment of the invention.

Yet another preferred form of the invention is shown in FIG. 12 and is designated as 180. The ball 180 has a core 182 which can be solid or wound, and a cover 184. The ball includes a core 182 which can be solid or wound, and can have one or more layers, and a cover 184 which can have one or more layers. The core has a PGA compression of 55 or less. The ball has a mechanical impedance with a primary minimum value in the frequency range of 2600 Hz or less after the ball has been maintained at 21.1° C., 1 atm. and about 50% relative humidity for at least 15 hours.

The composition of the cover may vary depending upon the desired properties for the resulting golf ball. A wide array of cover formulations may be utilized such as those disclosed in U.S. Pat. Nos. 4,986,545; 5,098,105; 5,120,791; 5,187,013; 5,306,760; 5,312,857; 5,324,783; 5,328,959; 5,330,837; 5,338,610; 5,542,677; 5,580,057; 5,591,803; and 5,733,206, all of which are hereby incorporated by reference.

The covered golf ball can be formed in any one of several methods known in the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 200° F. to about 300° F.

The golf ball produced is then painted and marked, painting being effected by spraying techniques.

Definitions

The following is a series of definitions used in the specification and claims.

PGA Compression

PGA compression is an important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects $2/10$th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression device. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160–Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Coefficient of Restitution

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely in elastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Shore D Hardness

As used herein, "Shore D hardness" of a cover layer is measured generally in accordance with ASTM D-2240, except the measurements are made on the curved surface of a molded cover layer, rather than on a plaque. Furthermore, the Shore D hardness of the cover layer is measured while the cover layer remains over the core and any underlying cover layers. When a hardness measurement is made on a dimpled cover, Shore D hardness is measured, to the best extent possible, at a land area of the dimpled cover.

Plastomers

Plastomers are polyolefin copolymers developed using metallocene single-site catalyst technology. Polyethylene plastomers generally have better impact resistance than polyethylenes made with Ziegler-Natta catalysts. Plastomers exhibit both thermoplastic and elastomeric characteristics. In addition to being comprised of a polyolefin such as ethylene, plastomers contain up to about 35 wt % comonomer. Plastomers include but are not limited to ethylene-butene copolymers, ethylene-octene copolymers, ethylene-hexene copolymers, and ethylene-hexene-butene terpolymers, as well as mixtures thereof.

The plastomers which are useful in the invention preferably are formed by a single site metallocene catalyst such as those disclosed in EP 29368, U.S. Pat. No. 4,752,597; U.S. Pat. No. 4,808,561; and U.S. Pat. No. 4,937,299 the teachings of which are incorporated herein by reference. Blends of plastomers can be used. As is known in the art, plastomers can be produced by solution, slurry and gas phase accesses but the preferred materials are produced by metallocene catalysis using a high pressure process by polymerizing ethylene in combination with other olefin monomers, such as butene-1, hexene-1, octene-1 and 4-methyl-1-pentene in the presence of catalyst system comprising a cyclopentadienyl-transition metal compound and an alumoxane.

Plastomers found especially useful in the invention are those sold by Exxon Chemical under the trademark "EXACT" and include linear ethylene-butene copolymers such as EXACT 3024 having a density of about 0.905 g/cc (ASTM D-1505) and a melt index of about 4.5 g/10 min. (ASTM D-2839); EXACT 3025 having a density of about 0.910 g/cc (ASTM D-1505) and a melt index of about 1.2 g/10 min. (ASTM D-2839); EXACT 3027 having a density of about 0.900 g/cc (ASTM D-1505) and a melt index of about 3.5 g/10 min. (ASTM D-2839). Other useful plastomers include but are not limited to ethylene-hexene copolymers such as EXACT 3031 having a density of about 0.900 g/cc (ASTM D-1505) and a melt index of about 3.5 g/10 min. (ASTM D-2839), as well as EXACT 4049, which is an ethylene-butene copolymer having a density of about 0.873 g/cc (ASTM D-1505) and a melt index of about 4.5 g/10 min. (ASTM D-2839). All of the above EXACT series plastomers are available from EXXON Chemical Co.

EXACT plastomers typically have a dispersion index ($M_w/M_n$ where $M_w$ is weight average molecular weight and $M_n$ is number average molecular weight) of about 1.5 to 4.0, preferably 1.5–2.4, a molecular weight of about 5,000 to 50,000, preferably about 20,000 to about 30,000 a density of about 0.86 to about 0.93 g/cc, preferably about 0.87 g/cc to about 0.91 g/cc, a melting point of about 140–220 F, and a melt flow index (MI) above about 0.5 g/10 mins, preferably about 1–10 g/10 mins as determined by ASTM D-1238, condition E. Plastomers which may be employed in the invention include copolymers of ethylene and at least one $C_3$–$C_{20}$ -olefin, preferably a $C_4$–$C_8$ -olefin present in an amount of about 5 to about 32 wt %, preferably about 7 to about 22 wt %, more preferably about 9–18 wt %. These plastomers are believed to have a composition distribution breadth index of about 45% or more.

Plastomers such as those sold by Dow Chemical Co. under the trade name ENGAGE also may be employed in the invention. These plastomers are believed to be produced in accordance with U.S. Pat. No. 5,272,236, the teachings of which are incorporated herein by reference. These .plastomers are substantially linear polymers having a density of about 0.85 g/cc to about 0.93 g/cc measured in accordance with ASTM D-792, a melt index (MI) of less than 30 g/10 minutes, a melt flow ratio ($I_{10}/I_2$) of about 7 to about 20, where $I_{10}$ is measured in accordance with ASTM D-1238 (190/10) and I is$_2$ measured in accordance with ASTM D-1238 (190/2.16), and a dispersion index $M_w/M_n$ which preferably is less than 5, and more preferably is less than about 3.5 and most preferably is from about 1.5 to about 2.5. These plastomers include homopolymers of $C_2$–$C_{20}$ olefins such as ethylene, propylene, 4-methyl-1-pentene, and the like, or they can be interpolymers of ethylene with at least one $C_3$–$C_{20}$-olefin and/or $C_2$–$C_{20}$ acetylenically unsaturated monomer and/or $C_4$–$C_{18}$ diolefins. These plastomers have a polymer backbone that is either unsubstituted or substituted with up to 3 long chain branches/1000 carbons. As used herein, long chain branching means a chain length of at least about 6 carbons, above which the length cannot be distinguished using $^{13}C$ nuclear magnetic resonance spectroscopy. The preferred ENGAGE plastomers are characterized by a saturated ethylene-octene backbone and a narrow dispersion index $M_w/M_n$ of about 2. Other commercially available plastomers may be useful in the invention, including those manufactured by Mitsui.

The dispersion index $M_w/M_n$ of plastomers made in accordance with U.S. Pat. No. 5,272,236 most preferably is about 2.0. Non-limiting examples of these plastomers include ENGAGE CL 8001 having a density of about 0.868 g/cc, a melt index of about 0.5 g/10 mins, and a Shore A hardness of about 75; ENGAGE CL 8002 having a density of about 0.87 g/cc, a melt index of about 1 gms/10 min, Shore A hardness of about 75; ENGAGE CL 8003 having a density of about 0.885 g/cc, melt index of about 1.0 gms/10 min, and a Shore A hardness of about 86; ENGAGE EG 8100 having a density of about 0.87 g/cc, a melt index of about 1 gms/10 min., and a Shore A hardness of about 87; ENGAGE 8150 having a density of about 0.868 g/cc, a melt index of about 0.5 gms/10 min, and a Shore A hardness of about 75; ENGAGE 8200 having a density of about 0.87 g/cc, a melt index of about 5 g/10 min., and a Shore A hardness of about 75; and ENGAGE EP 8500 having a density of about 0.87 gms/cc, a melt index of about 5 g/10 min., and a Shore A hardness of about 75.

Fillers

Fillers preferably are used to adjust the density, flex modulus, mold release, and/or melt flow index of the inner cover layer. More preferably, at least when the filler is for adjustment of density or flex modulus, it is present in an amount of at least five parts by weight based upon 100 parts by weight of the resin composition. With some fillers, up to about 200 parts by weight probably can be used. A density adjusting filler according to the invention preferably is a filler which has a specific gravity which is at least 0.05 and more preferably at least 0.1 higher or lower than the specific gravity of the resin composition. Particularly preferred density adjusting fillers have specific gravities which are higher than the specific gravity of the resin composition by 0.2 or more, even more preferably by 2.0 or more. A flex modulus adjusting filler according to the invention is a filler which, when used in an amount of e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler. A mold release adjusting filler is a filler which allows for easier removal of part from mold, and eliminates or reduces the need for external release agents which otherwise could be applied to the mold. A mold release adjusting filler typically is used in an amount of up to about 2 wt % based upon the total weight of the inner cover layer. A melt flow index adjusting filler is a filler which increases or decreases the melt flow, or ease of processing of the composition.

The cover layers may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

A density adjusting filler is used to control the moment of inertia, and thus the initial spin rate of the ball and spin decay. The additional a filler with a lower specific gravity than the resin composition results in a decrease in moment of inertia and a higher initial spin rate than would result if no filler were used. The addition of a filler with a higher specific gravity than the resin composition results in an increase in moment of inertia and a lower initial spin rate. High specific gravity fillers are preferred as less volume is used to achieve the desired inner cover total weight. Non-reinforcing fillers are also preferred as they have minimal effect on COR. Preferably, the filler does not chemically react with the resin composition to a substantial degree, although some reaction may occur when, for example, zinc oxide is used in a cover layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows in Table 10:

TABLE 10

| Filler Type | Spec. Gray | Comments |
|---|---|---|
| Precipitated hydrated silica | 2.0 | 1, 2 |
| Clay | 2.62 | 1, 2 |
| Talc | 2.85 | 1, 2 |
| Asbestos | 2.5 | 1, 2 |
| Glass fibers | 2.55 | 1, 2 |
| Aramid fibers (KEVLAR ™) | 1.441 | 1, 2 |
| Mica | 2.8 | 1, 2 |
| Calcium metasillicate | 2.9 | 1, 2 |
| Barium sulfate | 4.6 | 1, 2 |
| Zinc sulfide | 4.1 | 1, 2 |
| Lithopone | 4.2–4.3 | 1, 2 |
| Silicates | 2.1 | 1, 2 |
| Silicon carbide platelets | 3.18 | 1, 2 |
| Silicon carbide whiskers | 3.2 | 1, 2 |
| Tungsten carbide | 15.6 | 1 |

TABLE 10-continued

| Filler Type | Spec. Gray | Comments |
| --- | --- | --- |
| Diatomaceous earth | 2.3 | 1, 2 |
| Polyvinyl chloride | 1.41 | 1, 2 |
| Carbonates | | |
| Calcium carbonate | 2.71 | 1, 2 |
| Magnesium carbonate | 2.20 | 1, 2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1, 2 |
| Copper | 8.94 | 1 |
| Brass | 8.2–8.4 | 1 |
| Boron | 2.34 | 1 |
| Boron carbide whiskers | 2.52 | 1, 2 |
| Bronze | 8.70–8.74 | 1 |
| Cobalt | 8.92 | 1 |
| Berylliuim | 1.84 | 1 |
| Zinc | 7.14 | 1 |
| Tin | 7.31 | 1 |
| Metal Oxides | | |
| Zinc oxide | 5.57 | 1, 2 |
| Iron oxide | 5.1 | 1, 2 |
| Aluminum oxide | 4.0 | |
| Titanium oxide | 3.9–4.1 | 1, 2 |
| Magnesium oxide | 3.3–3.5 | 1, 2 |
| Zirconium oxide | 5.73 | 1, 2 |
| Metal Stearates | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| Particulate carbonaceous materials | | |
| Graphite | 1.5–1.8 | 1, 2 |
| Carbon black | 1.8 | 1, 2 |
| Natural bitumen | 1.2–1.4 | 1, 2 |
| Cotton flock | 1.3–1.4 | 1, 2 |
| Cellulose flock | 1.15–1.5 | 1, 2 |
| Leather fiber | 1.2–1.4 | 1, 2 |
| Micro balloons | | |
| Glass | 0.15–1.1 | 1, 2 |
| Cermaic | 0.2–0.7 | 1, 2 |
| Fly ash | 0.6–0.8 | 1, 2 |
| Coupling Agents Adhesion Promoters | | |
| Titanates | 0.95–1.17 | |
| Zirconates | 0.95–1.11 | |
| Silane | 0.95–1.2 | |

1 Particularly useful for adjusting density of the inner cover layer.
2 Particularly useful for adjusting flex modulus of the inner cover layer.
3 Particularly useful for adjusting mold release of the inner cover layer.
4 Particularly useful for increasing melt flow index of the inner cover layer.
All fillers except for metal stearates would be expected to reduce the melt flow index of the inner cover layer.

The amount of filler employed is primarily a function of weight requirements and distribution.

Ionomeric Resins

Ionomeric resins include copolymers formed from the reaction of an olefin having 2 to 8 carbon atoms and an acid which includes at least one member selected from the group consisting of alpha, beta-ethylenically unsaturated mono- or dicarboxylic acids with a portion of the acid groups being neutralized with cations. Terpolymer ionomers further include an unsaturated monomer of the acrylate ester class having from 1 to 21 carbon atoms. The olefin preferably is an alpha olefin and more preferably is ethylene. The acid preferably is acrylic acid or methacrylic acid. The ionomers typically have a degree of neutralization of the acid groups in the range of about 10–100%.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Cores and Related Properties

Using the ingredients tabled below, golf ball cores having a finished diameter of about 1.470 to about 1.475 inches were produced by compression molding and subsequent removal of a surface layer by grinding. Each core was formulated using 100 parts elastomer (rubber). In the formulations, the amounts of remaining ingredients are expressed in parts by weight, and the coefficient of restitution and compression achieved are set forth below.

Tables 11 and 12 summarize the results of testing of four core compositions.

TABLE 11

Composition of Golf Ball Cores

| | Trial | | | |
| --- | --- | --- | --- | --- |
| Component | 1 Control | 2 | 3 | 4 |
| Cariflex BR-1220[2] | 100 | — | — | — |
| Cariflex BCP-820[1] | — | 100 | 40 | 40 |
| Neo Cis 60[3] | — | — | 60 | — |
| CB-22[4] | — | — | — | 60 |
| Zinc Oxide (activator filler) | 30.9 | 31 | 30.7 | 30.2 |
| Zinc Stearate (activator) | 16 | 16 | 16 | 16 |
| ZDA (zinc diacrylate) | 21.1 | 209 | 21.5 | 22.5 |
| 231 XL (peroxide) | 0.90 | 0.90 | 0.90 | 0.90 |
| | 168.9 | 168.8 | 169.1 | 169.6 |

[1]See Table 1 for a description and properties of Cariflex BCP-B20
[2]See Table 4 for a description and properties of Cariflex BR-1220
[3]See Table 2 for a description and properties of Neo Cis 60
[4]See Table 3A for a description and properties of Buna CB-22

TABLE 12

Properties of Golf Ball Cores

| Property | 1 Control | 2 | 3 | 4 |
|---|---|---|---|---|
| Size (pole dia. inches) | 1.474 | 1.474 | 1.473 | 1.475 |
| Weight (grams) | 33.3 | 33.3 | 33.2 | 33.3 |
| Riehle Compression | 0.112 | 0.109 | 0.112 | 0.113 |
| C.O.R. | 0.776 | 0.785 | 0.781 | 0.781 |
| Nes Factor[1] | .888 | .894 (+6) | .893 (+5) | .894 (+6) |

[1]Nes Factor is the sum of the C.O.R. and the Riehle compression. The higher the number the higher the resilience. This adjusts the results for compression, i.e. Trial #2 has a compression of 0.109, this is 3 points harder than the control and is 9 points faster in C.O.R. than the control. This is a net gain of 6 points. Trial #3 has exactly the same compression as the control and needs no Nes Factor correction as both the C.O.R. and Nes Factor are 5 points higher.

The results of Table 12 show that the high Mooney BCP-820 is 9 points higher in C.O.R. vs. the control (low Mooney BR-1220). Blends of the high Mooney BCP-820 with Neodymium catalyzed Neo Cis 60 and CB-22 also show a 5 to 6 point gain in C.O.R.

The high Mooney BCP-820, while giving high C.O.R. values, is extremely difficult to process using conventional equipment. Blending the high Mooney BCP-820 with Neodymium catalyzed polybutadiene rubber solves the processing problems but maintains the high C.O.R. values.

Tables 13 and 14 summarize the results of additional testing.

TABLE 13

Composition of Golf Ball Cores

| Component | 1 | 2 | 3 | 4 | 5 | 6 |
|---|---|---|---|---|---|---|
| Cariflex BCP-B20 | 10 | — | — | 40 | 40 | 20 |
| Neo Cis 400 | — | 100 | — | 60 | — | — |
| Neo Cis 60 | — | — | 100 | — | 60 | 80 |
| Zinc Oxide | 31 | 31 | 31 | 31 | 31 | 31 |
| Zinc Stearate | 16 | 16 | 16 | 16 | 16 | 16 |
| ZDA | 20.9 | 20.9 | 20.9 | 20.9 | 20.9 | 20.9 |
| 231 XL | 0.90 | 0.90 | 0.90 | 0.90 | 0.90 | 0.90 |
|  | 168.8 | 168.8 | 168.8 | 168.8 | 168.8 | 168.8 |

TABLE 14

Properties of Golf Ball Cores

| Property | 1 | 2 | 3 | 4 | 5 | 6 |
|---|---|---|---|---|---|---|
| Size (pole dia. inches) | 1.476 | 1.475 | 1.476 | 1.476 | 1.476 | 1.476 |
| Weight (grams) | 33.4 | 33.3 | 33.4 | 33.4 | 33.4 | 33.3 |
| Riehle Compression | 0.107 | 0.119 | 0.116 | 0.115 | 0.112 | 0.114 |
| C.O.R. | 0.785 | 0.773 | 0.777 | 0.776 | 0.780 | 0.778 |
| Nes Factor | .892 | .892 | .893 | .891 | .892 | .892 |

The results in Table 14 show there is very little difference in the 6 trials when the C.O.R. is corrected for differences in compression, i.e. Nes Factor. The Neodymium rubber when used at 100% or when blended with high Mooney BCP-820 is equal to the properties of the high Mooney BCP-820 when used at 100%. Neodymium rubber when used at 100% is also extremely difficult to process due to high die swell during extrusion of preforms and high cold flow of the rubber causing deformed preforms resulting in very high rejects. Neodymium polybutadiene and high Mooney polybutadiene rubber such as BCP-820 cannot be processed when used alone at 100 parts or conventional equipment such as two roll mills and extruders.

When the two rubbers above are blended together, processing of the synergistic mixture becomes easy and practical without losing any performance or C.O.R.

Tables 15 and 16 summarize the results of testing of four additional core compositions.

TABLE 15

Composition of Golf Ball Cores

| Component | 1 | 2 | 3 | 4 |
|---|---|---|---|---|
| Cariflex BR-1220[1] | 70 | 100 | — | — |
| Taktene 220[2] | 30 | — | — | 30 |
| Shell BCP 820[3] | — | — | 100 | 70 |
| ZnO (activator filler) | 31.5 | 31.5 | 31.5 | 31.5 |
| Regrind (ground flash) | 16 | 16 | 16 | 16 |
| Zn Stearate (activator) | 16 | 16 | 16 | 16 |
| ZDA (zinc diacrylate) | 21.5 | 21.5 | 21.5 | 21.5 |
| 231 XL (peroxide) | 0.90 | 0.90 | 0.90 | 0.90 |
| Total | 155.9 | 185.9 | 185.9 | 185.9 |

[1]See Table 4 for properties of Cariflex BR-1220
[2]See Table 5A and 5B for properties of Taktene 220
[3]See Table 1 for properties of Shell BCP-820

TABLE 16

Properties of Golf Ball Cores

| Property | 1 Control | 2 | 3 | 4 |
|---|---|---|---|---|
| Size (dia. inches) | 1.493 | 1.492 | 1.492 | 1.492 |
| Weight (grams) | 34.4 | 34.4 | 34.5 | 34.4 |
| Riehle Compression | .099 | .095 | .093 | .096 |
| C.O.R. | 0.778 | 0.781 | 0.787 | 0.782 |
| Durability | Pass | Pass | Pass | Pass |
| Nes Factor[1] | .877 | .876 | .880 | .878 |

[1]Nes Factor is the sum of the C.O.R and Riehle compression. The higher the number the higher the resilience. This adjusts the results for compression, i.e. Trial #3 is 6 points harder than the control but is 9 points faster in C.O.R. This is a net gain of 3 points. (If the ZDA level is adjusted in each trial so that the compression is exactly the same, then trial #3 would be 3 points higher in C.O.R)

Tables 17 and 18 summarize the results of testing of additional core compositions.

TABLE 17

Composition of Golf Ball Cores

| Component | 1 Control | 2 |
|---|---|---|
| Cariflex BR-1220 | 70 | — |
| Taktene 220 | 30 | — |
| Shell BCP-820 | — | 100 |
| ZnO | 31.5 | 32.0 |

TABLE 17-continued

Composition of Golf Ball Cores

| | Trial | |
|---|---|---|
| Component | 1 Control | 2 |
| Regrind | 16 | 16 |
| Zn Stearate | 16 | 16 |
| ZDA | 21.5 | 20.5 |
| 231XL | 0.90 | 0.90 |
| Total | 185.9 | 185.4 |

TABLE 18

Properties of Golf Ball Cores

| | Trial | |
|---|---|---|
| Property | 1 Control | 2 |
| Size (dia. inches) | 1.542 | 1.543 |
| Weight (grams) | 37.8 | 38.0 |
| Riehle Compression | .093 | .093 |
| C.O.R. | 0.775 | 0.782 |
| Nes factor | .868 | .875 |

Tables 17 and 18 demonstrate that when the Zinc Diacrylate (ZDA) level is adjusted to obtain the same Riehle compression as the Control, the C.O.R. increased 7 points higher for the BCP-820 and the Nes Factor was also 7 points higher.

Tables 19 and 20 summarize the results of additional testing of core compositions.

TABLE 19

Composition of Golf Ball Cores

| | Trial | | |
|---|---|---|---|
| Component | 1 Control | 2 | 3 |
| Cariflex BR-1220 | 70 | 100 | — |
| Taktene 220 | 30 | — | — |
| Shell BCP-820 | — | — | 100 |
| ZnO | 31.5 | 31.7 | 31.8 |
| Regrind | 16 | 16 | 16 |
| Zn Stearate | 16 | 16 | 16 |
| ZDA | 21.5 | 21.1 | 19.9 |
| 231 XL | 0.90 | 0.90 | 0.90 |
| Total | 185.9 | 185.7 | 184.6 |

TABLE 20

Properties of Golf Ball Cores

| | Trial | | |
|---|---|---|---|
| Property | 1 Control | 2 | 3 |
| Size (dia. inches) | 1.493 | 1.493 | 1.494 |
| Weight (grams) | 34.5 | 34.4 | 34.3 |
| Riehle Compression | .098 | .104 | .106 |

TABLE 20-continued

Properties of Golf Ball Cores

| | Trial | | |
|---|---|---|---|
| Property | 1 Control | 2 | 3 |
| C.O.R. | 0.777 | 0.773 | 0.776 |
| Nes Factor | .875 | .877 | .882 |

Tables 19 and 20 demonstrate that, despite adjusting the ZDA level, the Riehle compressions were different. However, the Nes Factor shows that Trial #3 using 100% BCP-820 is 7 points higher than the Control.

Table 21 summarizes additional testing.

TABLE 21

Composition of Golf Ball Cores

| | Trial | |
|---|---|---|
| Component | 1 Control | 2 |
| Cariflex BR-1220 | 70 | — |
| Taktene 220 | 30 | — |
| BCP-820 | — | 100 |
| ZnO | 31.5 | 31.8 |
| Regrind | 16 | 16 |
| Zn Stearate | 16 | 16 |
| ZDA | 20 | 19.4 |
| 231 XL | 0.90 | 0.90 |
| TOTAL | 184.4 | 184.1 |

Tables 22A–22D and 23 summarize the resulting balls and their components.

TABLE 22A

Properties of Cores, Mantled Cores, Molded and Finished Balls

| | Trial | |
|---|---|---|
| Core Property | 1 Control | 2 |
| Size (dia. inches) | 1.508 | 1.511 |
| Weight (grams) | 35.4 | 35.7 |
| Riehle Compression | .105 | 98 |
| C.O.R. | 0.771 | 0.781 |
| Nes Factor | .876 | .879 (+3) |

Cores were centerless ground to 1.470" and injection molded with a high modulus clear ionomer mantle. See Table 23 for mantle composition.

TABLE 22B

| | 1 | |
|---|---|---|
| Mantled Cores | Control | 2 |
| Size (dia. inches) | 1.568 | 1.570 |
| Weight (grams) | 38.4 | 38.4 |
| Riehle Compression | .085 | .081 |
| C.O.R. | 0.802 | 0.808 |
| Nes Factor | .887 | .889 (+2) |

Mantled cores were injection molded with a soft, low modulus ionomer cover into dimpled molded golf balls. See Table 23 for cover composition.

TABLE 22C

| Molded Golf Balls | 1 Control | 2 |
|---|---|---|
| Size (dia. inches) | 1.683 | 1.683 |
| Weight (grams) | 45.3 | 45.4 |
| Riehle Compression | .081 | .080 |
| C.O.R. | 0.787 | 0.792 |
| Nes Factor | .868 | .872 (+4) |

Molded balls were trimmed, brush tumbled, primed, stamped, and clear coated.

TABLE 22D

| Finished Golf Balls | 1 Control | 2 |
|---|---|---|
| Size (dia. inches) | 1.682 | 1.682 |
| Weight (grams) | 45.6 | 45.7 |
| Riehle Compression | .080 | .080 |
| C.O.R. | 0.786 | 0.790 |
| Nes Factor | .866 | .870 (+4) |

TABLE 23

Composition of Mantle and Cover

| Mantle Component | |
|---|---|
| Iotek 1002/5031 | 50 |
| Iotek 1003/5041 | 50 |
| | 100 |
| Cover Component | |
| Iotek 7510 | 41 |
| Iotek 7520 | 41 |
| Iotek 8000 | 8.5 |
| T.G. White M.B. | 9.4 |
| | 99.9 |

It is evident from the proceeding tables that the high Mooney cobalt catalyzed polybutadiene BCP-820 produces a higher C.O.R. (3–7 points) vs. the low Mooney cobalt catalyzed polybutadiene. Blending with the low Mooney polybutadiene produces less of a gain in C.O.R.

EXAMPLE 2

Manufacture of Golf Balls

A number of golf ball cores were made having the following formulation and characteristics as shown in Table 24.

TABLE 24

| Material | Weight |
|---|---|
| High Cis Polybutadiene Cariflex BR-1220[1] | 70 |
| High Cis polybutadiene Taktene 220[2] | 30 |
| Zinc Oxide[3] | 25 |
| Core Regrind[4] | 20 |
| Zinc Stearate[5] | 15 |
| Zinc Diacrylate[6] | 18 |

TABLE 24-continued

| Material | Weight |
|---|---|
| Red Colorant | .14 |
| Peroxide (Luperco 23/XL or Triganox 29/40)[7] | .90 |

[1]Muehlstein, Nowalk, CT
[2]Bayer Corp. Akron, OH
[3]Zinc Corp of America, Monaca, PA
[4]golf ball core regrind (internal source)
[5]Synpro, Cleveland, OH
[6]Rockland React Rite, Rockland, GA
[7]R.T. Vanderbilt, Norwalk, CT The cores had a diameter of 1.560 inches, a PGA compression of about 40 and a COR of about 0.775. To make the cores, the core ingredients were intimately mixed in an internal mixer until the compositions were uniform, usually over a period of from about 5 to about 20 minutes. The sequence of addition of the components was not found to be critical. As a result of shear during mixing, the temperature of the core mixtures rose to about 190° F. whereupon the batch was discharged onto a two roll mill, mixed for about one minute and sheeted out.

The sheet was rolled into a "pig" and then placed in a Barwell preformer and slugs produced. The slugs were then subjected to compression molding at about 310° F. for about 11½ minutes. After molding, the cores were cooled under ambient conditions for about 4 hours. The molded cores were then subjected to a centerless grinding operation whereby a thin layer of the molded core was removed to produce a round core having a diameter of 1.2 to 1.5 inches. Upon completion, the cores were measured for size and in some instances weighed and tested to determine compression and COR.

The cores were covered with an injection-molded cover blend of 35 parts by weight EX® 1006 (Exxon Chemical Corp., Houston, Tex.), 55.6 parts by weight EX 1007 (Exxon Chemical Corp., Houston, Tex.) and 9.4 parts by weight of Masterbatch. The Masterbatch contained 100 parts by weight Iotek 7030, 31.72 parts by weight titanium dioxide (Unitane 0-110), 0.6 parts by weight pigment (Ultramarine Blue), 0.35 parts by weight optical brightener (Eastobrite OB1) and 0.05 parts by weight stabilizer (Santanox R).

The cover had a thickness of 0.055 inches and a Shore D hardness of 67. The balls had a PGA compression of 65 and a COR of 0.795.

EXAMPLE 3

Manufacture of Golf Balls

The procedure of Example 2 was repeated with the exception that a different cover formulation was used.

The cores were covered with a cover blend of 54.5 parts by weight Surlyn 9910, 22.0 parts by weight Surlyn 8940, 10.0 parts by weight Surlyn 8320, 4.0 parts by weight Surlyn 8120, and 9.5 parts by weight of Masterbatch. The Masterbatch had the same formulation as that of Example 2.

The cover had a thickness of 0.55 inches and a Shore D hardness of 63. The balls had a PGA compression of 63 and a COR of 0.792.

EXAMPLE 4

Frequency Measurements of Golf Club/Ball Contact Based Upon Sound

A number of frequency measurements based upon audible sound were made for the sound of contact between a putter and 11 different types of golf balls, including the balls of Example 2. Three balls of each type were tested.

The putter was a 1997 Titleist Scotty Cameron putter. An accelerometer (Vibra-Metrics, Inc., Hamden, Conn., Model 9001A, Serial No. 1225) was placed on the back cavity of the putter head. The output of the accelerometer was powered by a Vibra-Metrics, Inc., Hamden, Conn., Model P5000 accelerometer power supply, at a gain of ×1. A microphone was positioned proximate to the intended point of contact between the putter and the ball. The microphone stand was placed at the distal end of the putter head such that the microphone itself was positioned 3 centimeters above the sweet spot at a downfacing angle of 30°. A preamplifier (Realistic Model 42-2101A, Radio Shack) was used for the microphone. Signals were collected using a Metrabyte Das-58 A-D board with a SSH-04 simultaneous sample and hold module (Keithley Instruments, Cleveland, Ohio) at a rate of 128 kHz. The microphone was a Radio Shack Model 33-3007 unidirectional condenser microphone with a frequency response of 50–15000 Hz.

The putter was positioned by a putting pendulum so that when properly balanced the ground clearance was one millimeter. The balls were hit from the sweet spot of the putter. The club was drawn back to the 20° mark on the putting pendulum. Contact with the ball occurred when the putter was at a 90° angle relative to the ground.

The point of contact between the club and the ball could be determined by viewing the signal from the accelerometer. Pre-trigger and post-trigger data was collected for each shot. Data was collected at 128 kHz for a duration of 64 microseconds, resulting in 8,192 data points per shot. The data was saved in ASCII text files for subsequent analysis. Each ball was struck 10 times in a random sequence, i.e., all 33 balls were struck before any ball was struck a second time and the striking order was randomly changed for each set of hits. Data for the three balls of each particular type was averaged. The results are shown below on Table 25.

TABLE 25

| MANU. | BALL | SOUND FREQ. | STD. DEV. | COR (x1000) | PGA COMP |
|---|---|---|---|---|---|
| | Example 2 | 3.12 | 0.06 | 800 | 67 |
| Top Flite | Strata Tour 90 | 3.20 | 0.18 | 772 | 92 |
| | Strata Tour 100 | 3.46 | 0.03 | | |
| Titleist | Tour Balata (W) | 3.31 | 0.18 | 780 | 78 |
| | HP2 Tour | | 3.73 | 0.29 | 772 |
| | DT Wound 100 | 3.66 | 0.29 | | |
| | DT 2P (90) | 3.39 | 0.04 | 820 | 99 |
| | HP2 Dist (90) | 3.33 | 0.14 | 803 | 99 |
| | Professional 100 | 3.70 | 0.30 | 780 | 93 |
| Maxfli | XF 100 | 4.45 | 0.27 | 780 | 90 |
| Bridgestone | Precept DW | 3.40 | 0.08 | 785 | 93 |

As shown by the results on Table 25, the balls of Example 2 had a lower frequency measurement based upon sound than all of the other balls that were tested.

EXAMPLE 5
Golf Ball Mechanical Impedance and Natural Frequency Determinations

Mechanical impedance and natural frequency of the golf balls of the invention were determined, along with the mechanical impedance and natural frequency of commercially available golf balls.

Impedance was determined using a measurement of acceleration response over sine-sweep based frequencies.

Figure 13:
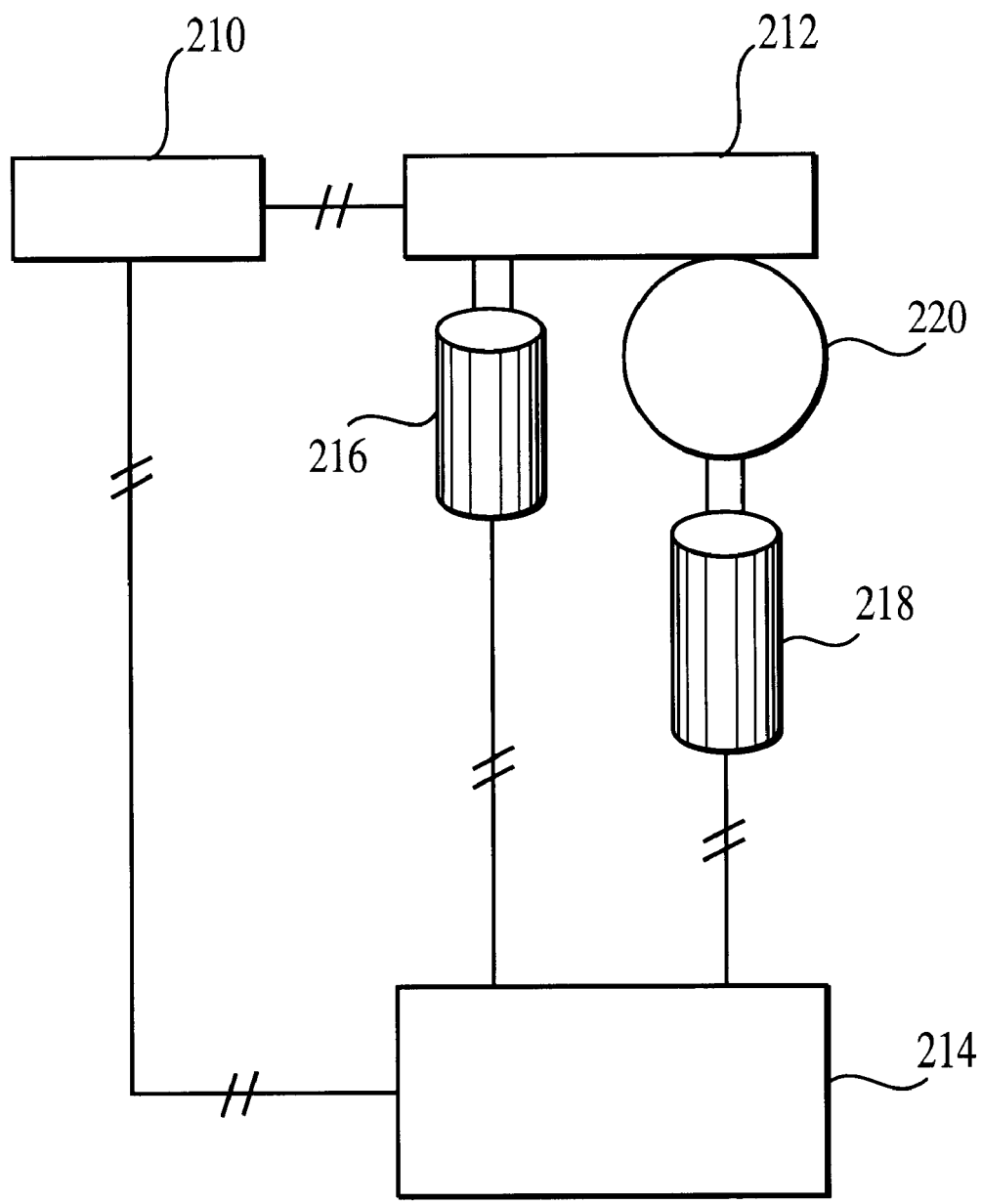
FIG. 13 schematically shows the equipment used to determine mechanical impedance of the golf balls of the present invention.

FIG. 13 schematically shows the equipment used to determine mechanical impedance of golf balls in accordance with the present invention. A power amplifier 210 (IMV Corp. PET-0A) was obtained and connected to a vibrator 212 (IMV Corp. PET-01). A dynamic signal analyzer 214 (Hewlett Packard 35670A) was obtained and connected to the amplifier 210 to provide a sine-sweep source to 10,000 Hz. An input accelerometer 216 (PCB Piezotronics, Inc., New York, A353B17) was physically connected to the vibrator 212 (with Loctite 409 adhesive and electrically connected to the dynamic signal analyzer 214. The dynamic signal analyzer 214 was programmed such that it could calculate the mechanical impedance given two acceleration measurements and could plot this data over a frequency range.

An output accelerometer 218 (PCB Piezotronics, Inc., New York, A353B17) was obtained and electrically connected to the dynamic signal analyzer 214. A first golf ball sample 220 was obtained and bonded to the vibrator 212 using Loctite 409 adhesive. The output accelerometer 218 also was bonded to the ball using Loctite 409 adhesive. The vibrator 212 was turned on and a sweep was made from 100 to 10,000 Hz. Mechanical impedance was then plotted over this frequency range.

The natural frequency was determined by observing the frequency at which a second minimum occurred in the impedance curve. The first minimum value was determined to be a result of forced node resonance resulting from contact with the accelerometer 218 or the vibrator 212. This determination about the first minimum value is based upon separate tests which compared the above described mechanical impedance test method, referred to the "sine-sweep method" of determining mechanical impedance, as compared to an "impact method" in which a golf ball is suspended from a string and is contacted with an impact hammer on one side with accelerometer measurements taken opposite the impact hammer.

The mechanical impedance and natural frequency of the balls of Examples 2 and 3 above were determined using the above-described method. The first set of data was taken with the balls at room temperature. The second set of data was taken after the balls had been maintained at 21.1° C. (70° F.) for a period of time, preferably at least 15 hours. Furthermore, 12 commercially available golf balls also were tested. The results are shown below on Table 26.

TABLE 26

| BALL | NAT. FREQ. (Hz) | NAT. FREQ. (Hz) | COR | PGA COMP |
|---|---|---|---|---|
| Example 2 | 3070 Hz | 2773 | 799 | 67 |
| Example 3 | 2773 Hz | 2575 | 792 | 63 |
| Top-Flite | | | | |
| Strata Tour 90 | 3268 Hz | 2674 | 772 | 92 |
| Magna Ex | 3268 Hz | 3169 | | |
| Z Balata 90 | | 3268 | | |
| Titleist | | | | |
| Tour Balata 100 (wound) | 3070 | 2773 | 780 | 78 |
| Professional 100 (wound) | 3862 Hz | | 780 | 93 |
| DT Wound 100 (wound) | 3664 Hz | 2872 | | |
| HP2 Tour | 3763 Hz | | 772 | 92 |
| Tour Balata 90 (wound) | | 2674 | | |
| Wilson | | | | |
| Staff Ti Balata 100 | 3565 Hz | | 791 | 90 |
| Staff Ti Balata 90 | | 3466 | | |
| Ultra 500 Tour Balata | 3862 Hz | | | 100 |
| Bridgestone | | | | |
| Precept EV Extra Spin | 3664 Hz | | 785 | 93 |
| Precept Dynawing | 3466 Hz | | 803 | 87 |
| Maxfli | | | | |
| XF100 | 3763 Hz | | 780 | 90 |
| RM 100 | 3466 Hz | | 792 | 84 |
| Sumitomo | | | | |
| Srixon Hi-brid | | 2773 | | |

Additionally, a non-commercial, non-wound ball with a liquid (salt/sugar water) core was tested and was found to have a natural frequency of 3961.

As shown by the results on Table 26, the balls of the present invention have a low natural frequency in combination with a relatively high COR. The low natural frequency provides the balls with a soft sound and feel while maintaining good distance.

EXAMPLE 6

Measurement of Core Hardness Gradient

Another series of trials were carried out in which the core hardness gradient was measured for the most preferred core composition according to the present invention. As will be recalled, that most preferred core composition is set forth in Table 6 herein.

TABLE 27

| | Most Preferred Core Composition (Set Forth in Table 6) |
|---|---|
| Surface | 76 |
| 5 mm in | 71 |
| 10 mm in | 67 |
| 15 mm in | 65 |
| Center | 63 |
| 5 mm out | 66 |
| 10 mm out | 68 |
| 15 mm out | 69 |
| Core Size | 1.560" |

EXAMPLE 7

Production and Testing of Preferred Embodiment Golf Balls

In yet another series of trials, a series of particularly preferred cores and covers were formed to produce particularly preferred golf balls in accordance with the present invention. These preferred cover compositions and core compositions are set forth below in Tables 28A and 28B, respectively.

TABLE 28

| | Cover Compositions | | | | |
|---|---|---|---|---|---|
| | 39A | 39B | 39C | 39D | 39E |
| Materials | (wt %) | (wt %) | (wt %) | (wt %) | (wt %) |
| Iotek 1006 | — | 43.75 | — | — | 43.75 |
| Iotek 1007 | — | 43.75 | — | — | — |
| Surlyn 8940 | 21 | — | — | — | — |
| Surlyn 9910 | 52.8 | — | — | — | — |
| Surlyn 8120 | 4 | — | — | — | — |
| Surlyn 8320 | 9.7 | — | — | — | — |
| Surlyn 8140 | — | — | 35 | — | — |
| Surlyn 6120 | — | — | 52.5 | 87.5 | 43.75 |
| Shite MB | 12.5 | 12.5 | 12.5 | 12.5 | 12.5 |

TABLE 28B

| | Core Formulations | | |
|---|---|---|---|
| Materials | 37A (pph) | 37B (pph) | 37C (pph) |
| BCP-820 | 45 | 45 | 45 |
| Neo Cis 40 | 55 | 55 | 55 |
| Zinc Oxide | 29.5 | 23.9 | 23.2 |
| Zinc Stearate | 16 | 16 | 16 |
| Zinc Diacrylate (ZDA) | 18.4 | 20.4 | 21.9 |
| Lavender MB | — | 0.14 | — |
| Blue MB | | | |
| Yellow MB | 0.14 | | 0.14 |
| Triganox 42-40B | 1.25 | 1.25 | 1.25 |

Golf balls were produced using various combinations of these cover and core compositions. A summary of these balls is set forth below in Table 28C. The noted barrel test is utilized to determine an indication of durability. This test is described in detail in U.S. Pat. Nos. 5,827,134 and 5,820,489 herein incorporated by reference. Basically, the test involves the use of an air cannon that fires a golf ball at about 135 ft/second into a five-sided steel drum until the ball breaks. One dozen of each ball type is tested. The average is the average number of runs until the ball breaks. Higher averages indicate greater durability.

TABLE 28C

| | CORE COVER FINISHED | | | | | | | | | | |
|---|---|---|---|---|---|---|---|---|---|---|---|
| | Sample | | | | | | | | | | |
| | 1 | 2 | 3 | 4 | 5 | 6 | 7 | 8 | 9 | 10 | 11 |
| | 37A | 37A | 37A | 37B | 37B | 37B | 37B | 37B | 37C | 37C | 37C |
| Size | 1500" | 1.500" | 1.500" | 1.560" | 1.560" | 1.560" | 1.560" | 1560" | 1.560" | 1.560" | 1560" |
| Weight | 34.3 | 34.3 | 34.3 | 37.8 | 37.8 | 37.8 | 37.8 | 37.8 | 37.8 | 37.8 | 37.8 |
| Comp | 134 | 134 | 134 | 116 | 116 | 116 | 116 | 116 | 106 | 106 | 106 |
| COR | 766 | 766 | 765 | 781 | 781 | 781 | 781 | 781 | 786 | 786 | 786 |
| 39A | | | | X | | | | | | | |
| 39B | X | | | | X | | | | X | | |
| 39C | | X | | | | X | | | | X | |
| 39D | | | X | | | | X | | | | X |
| 39E | | | | | | | | X | | | |
| Cover Thickness | 0.090" | 0.090" | 0.09" | 0.060" | 0.060" | 0.060" | 0.060" | 0.060" | 0.060" | 0.060" | 0.060" |
| Size | 168 | 1681 | 1.682 | 1.683 | 1.683 | 1.684 | 1.683 | 1683 | 1.683 | 1.684 | 1.685 |
| Weight | 45.3 | 45.3 | 45.3 | 45.5 | 45.4 | 45.5 | 45.4 | 45.4 | 45.5 | 45.5 | 45.5 |
| Riehle Comp | 90 | 82 | 87 | 97 | 94 | 89 | 91 | 91 | 68 | 83 | 85 |

TABLE 28C-continued

CORE COVER FINISHED

| | Sample | | | | | | | | | | |
|---|---|---|---|---|---|---|---|---|---|---|---|
| | 1 | 2 | 3 | 4 | 5 | 6 | 7 | 8 | 9 | 10 | 11 |
| | 37A | 37A | 37A | 37B | 37B | 37B | 37B | 37B | 37C | 37C | 37C |
| COR | 809 | 815 | 807 | 803 | 812 | 816 | 812 | 814 | 814 | 818 | 814 |
| Shore D | 67 | 70–71 | 69–70 | 65 | 67 | 70–71 | 69–70 | 69 | 67 | 70–71 | 69–70 |
| Cold Crack | Pass | Pass | Pass | Pass | Pass | Pass | Pass | Pass | Pass | Pass | Pass |
| Barrel (1 dozen) Durability | | | | | | | | | | | |
| Avg | 309 | 283 | 325 | 312 | 285 | 269 | 315 | 308 | 348 | 306 | 375 |
| Min | 256 | 206 | 256 | 272 | 225 | 206 | 194 | 239 | 256 | 225 | 281 |
| max | 500 | 332 | 380 | 380 | 344 | 306 | 541 | 380 | 500 | 352 | 570 |
| # above 300 | 7 | 3(of 13) | 10 | 7 | 3 | 1(of 11) | 5 | 6 | 10 | 7 | 11 |

All core formulations are in accordance with the present invention. Sample 4 may be considered a control. All other balls utilized a harder cover. This reduced spin and resulted in superior COR.

In another set of trials, a series of particularly preferred cores and covers were formed to produce particularly preferred golf balls in accordance with the present invention. These preferred cover compositions and core compositions are set forth below in Tables 29A and 29B, respectively.

TABLE 29A

| Materials | Cover A (wt %) | Cover B (wt %) | Cover C (wt %) |
|---|---|---|---|
| Iotek 1006 | — | 35 | — |
| Iotek 1007 | — | 52.5 | — |
| Surlyn 8140 | 35 | — | — |
| Surlyn 6120/8552 | 52.5 | — | — |
| Surlyn 9910 | — | — | 54.6 |
| Surlyn 8940 | — | — | 22 |
| Surlyn 8120 | — | — | 4 |
| Surlyn 8320 | — | — | 10 |
| White MB | 12.5 | 12.5 | 9.4 |

TABLE 29B

| | Control | | |
|---|---|---|---|
| | 1 | 2 | 3 |
| Cariflex BR-1220 | 70 | | |
| Taktene 1220 | 30 | | |
| BCP-820 | | 40 | 40 |
| Nes Cis 60 | | 30 | 30 |
| Nes Cis 40 | | 30 | 30 |
| ZnO | 24.9 | 23.2 | 23.7 |
| T.G. Regrind | 20 | | |
| Zn Stearate | 15 | 16 | 16 |
| Zinc Diacrylate (ZDA) | 18.3 | 21.7 | 20.7 |
| Color M.B. | .14 | | .14 |
| | Red | White | Lav. |
| 231 XL | 0.90 | 1.25 | 1.25 |
| | 179.24 | 162.15 | 161.79 |
| size pole | 1.560 | 1.557 | 1.557 |
| wgt. | 37.8 | 37.6 | 37.6 |
| Comp. | 114 | 109 | 114 |
| COR | .775 | .789 | .787 |

These various preferred cover and core formulations were utilized to provide a series of particularly preferred golf balls. A summary of these balls is set forth in Table 29C.

TABLE 29C

| | | Sample | | | | | | | | |
|---|---|---|---|---|---|---|---|---|---|---|
| | | 1 | 2 | 3 | 4 | 5 | 6 | 7 | 8 | 9 |
| | | | | | Nos. | | | | | |
| | | 1(C) | 2 | 3 | 1(C) | 2 | 3 | 1(C) | 2 | 3 |
| Core Data | Size | 1.56 | 1.557 | 1.557 | 1.56 | 1.557 | 1.557 | 1.56 | 1.557 | 1.557 |
| | Weight | 37.8 | 37.6 | 37.6 | 37.8 | 37.6 | 36.6 | 37.8 | 37.6 | 37.6 |
| | Comp | 114 | 109 | 114 | 114 | 109 | 114 | 114 | 109 | 114 |
| | COR | 775 | 789 | 787 | 775 | 789 | 787 | 775 | 789 | 787 |
| Cover Type | Magna Ex (C) | | | | | | | X | X | X |
| | 1006/1007 (B) | | | | X | X | X | | | |
| | 8140/6120 (A) | X | X | X | | | | | | |
| | PGA Comp. | 69 | 74 | 70 | 65 | 70 | 65 | 63 | 66 | 63 |

TABLE 29C-continued

|  |  | Sample |  |  |  |  |  |  |  |  |
|---|---|---|---|---|---|---|---|---|---|---|
|  |  | 1 | 2 | 3 | 4 | 5 | 6 | 7 | 8 | 9 |
|  |  |  |  |  |  | Nos. |  |  |  |  |
|  |  | 1(C) | 2 | 3 | 1(C) | 2 | 3 | 1(C) | 2 | 3 |
| Ball | Riehle Comp | 91 | 86 | 90 | 95 | 90 | 95 | 97 | 94 | 97 |
| Data | COR | 810 | 820 | 818 | 803 | 813 | 812 | 796 | 806 | 804 |
|  | Shore D | 70 | 70 | 70 | 67 | 67 | 67 | 64 | 64 | 64 |
|  | Barrel (Avg) Durability |  | 503 |  |  | 615 |  |  | 660 |  |
|  | Min |  | 302 |  |  | 456 |  |  | 433 |  |
|  | Max |  | 696 |  |  | 818 |  |  | 852 |  |
|  | NES Factor | 901 | 906 | 908 | 898 | 903 | 907 | 893 | 900 | 901 |

Sample 7 may be considered a control. The cores used in Samples 1, 4, and 7 are controls.

EXAMPLE 8

An additional embodiment according to the present invention utilizes blends of the Neo Cis polymers in the core compositions. The following Table represents core formulations which utilizes a blend of Neo Cis 40 and Neo Cis 60 with Cariflex BCP-820 (amounts of ingredients are in parts per hundred rubber (phr) based on 100 parts butadiene rubber):

TABLE 30

|  | Formulation No. | | | |
|---|---|---|---|---|
| Ingredient | 1 | 2 | 3 | 4 |
| Cariflex BCP-820 | 40 | 40 | 40 | 40 |
| Neo Cis 60 | 30 | 30 | 30 | 30 |
| Neo Cis 40 | 30 | 30 | 30 | 30 |
| Zinc Oxide | 31.4 | 30.9 | 26 | 24.6 |
| Zinc Stearate | 16 | 16 | 16 | 16 |
| ZDA | 18.2 | 19.2 | 18.2 | 19.6 |
| Yellow MB | 0.14 | — | — | — |
| Green MB | 0.05 | — | — | — |
| Black MB | — | 0.2 | — | — |
| Red MB | — | — | 0.075 | 0.075 |
| Blue MB | — | — | 0.075 | 0.075 |
| Triganox 42-40B | 1.25 | 1.25 | 1.25 | 1.25 |

The core formulations set forth above in Table 30 were then utilized to produce the following corresponding cores:

TABLE 31

|  | Core Sample | | | |
|---|---|---|---|---|
| Property | 1 | 2 | 3 | 4 |
| Size (pole dia. inches) | 1.47" ± 0.004 | 1.47" ± 0.004 | 1.47" ± 0.004 | 1.47" ± 0.004 |
| Weight (grams) | 33.3 g ± 0.3 | 33.3 g ± 0.3 | 31.5 ± 0.3 | 31.5 ± 0.3 |
| Riehle Comp. | 136 ± 10 | 125 ± 10 | 145 ± 8 | 135 ± 8 |
| C.O.R. | 0.775 ± 0.015 | 0.765 ± 0.015 | 0.760 ± 0.015 | 0.770 ± 0.015 |
| Specific Gravity | 1.194 ± 0.05 | 1.194 ± 0.05 | 1.168 | 1.168 |
| JIS C | 69 ± 2 | 71 ± 2 | 70 ± 2 | 71 ± 2 |
| Shore C | 69 ± 2 | 71 ± 2 | 70 ± 2 | 71 ± 2 |
| Shore D | 40 ± 2 | 42 ± 2 | 41 ± 2 | 42 ± 2 |

In a preferred embodiment, the cores utilizing the blend of Neo Cis 40 and Neo Cis 60 have a mantle or inner cover layer formed thereon. A variety of ionomers may be utilized in the mantle or inner cover layer of the multi-layer golf balls according to the present invention. Ionomeric resins such as those designated as Surlyn®, manufactured by DuPont, and Iotek, manufactured by Exxon, are suitable for forming the mantle layer, but any polymer conventionally used to form inner cover layers in the multi-layer golf balls can be used. The following Table 32 includes ionomers which are exemplary of specific ionomers which may be utilized in the inner cover layer of multi-layer balls according to the present invention. These examples are not intended to be limiting of the specific ionomers which can be used.

TABLE 32

|  | Individual Ionomers | | |
|---|---|---|---|
|  | Iotek 1002 | Iotek 1003 | Surlyn B552 |
| % Acid Type | 18% AA | 18% AA | 19% MA |
| Ionomer Type | Copolymer | Copolymer | Copolymer |
| Cation | Na | Zn | Mg |
| Melt Index | 2 | 1 | 1.3 |
| Stiffness Modulus *2 | 4053 MPa | 1873 MPa | 3499 Kfg/cm$^2$ |

AA = Acrylic Acid.
MA = Methacrylic Acid
*2 Stiffness measurements done using Toyoselki Stiffness Tester The mantle layer may also contain other additives such as heavy weight fillers including bronze, brass, tungsten, and the like.

The following represents various intermediate golf balls formed from the cores of Table 31.

TABLE 33

|  | Intermediate Ball with Inner Cover | | | |
|---|---|---|---|---|
|  | 1 | 2 | 3 | 4 |
| Core Formulation (From Table 31) | 1 | 2 | 3 | 4 |
| Mantle Composition (Wt %) |  |  |  |  |
| Iotek 1002 (Na) | 50% | 50% | 35% | 35% |
| Iotek 1003 (Zn) | 50% | 50% | — | — |
| Surlyn 8552 (Ma) | — | — | 65% | 65% |
| Filler (Bronze Powder) | — | — | 19.0 pph | 19.0 pph |
| TIO$_2$ | — | — | 0.1 pph | 0.1 pph |

The inner cover layers, or mantles, as set forth in Table 33 above have the following characteristics as shown in Table 34 below:

TABLE 34

| Property | Intermediate Ball (from Table 33) | | | |
|---|---|---|---|---|
| | 1 | 2 | 3 | 4 |
| Flex Modulus (weighted avg.) | 264 MPa | 264 MPa | 264 MPa | 264 MPa |
| Stiffness Modulus | 3521 Kgf/cm$^2$ | 3521 Kgf/cm$^2$ | 3521 Kgf/cm$^2$ | 3521 Kgf/cm$^2$ |
| Size (intermediate ball) | 1.570" ± 0.004 | 1.570" ± 0.004 | 1.570" ± 0.004 | 1.570" ± 0.004 |
| Weight (intermediate ball) | 38.3 g ± 0.3 | 38.3 g ± 0.3 | 38.3 g ± 0.3 | 38.3 g ± 0.3 |
| Thickness | 0.050" ± 0.008 | 0.060" ± 0.008 | 0.050" ± 0.008 | 0.050" ± 0.008 |
| Riehle Comp | 122 ± 12 | 112 ± 12 | 112 ± 12 | 106 ± 8 |
| C.O.R. | 0.780 ± 0.015 | 0.790 ± 0.015 | 0.790 ± 0.015 | 0.795 ± 0.015 |
| Mantle Specific Gravity | 0.96 ± 0.01 | 0.96 ± 0.01 | 1.12 ± 0.05 | 1.12 ± 0.05 |
| JIS C | 97 ± 1 | 97 ± 1 | 97 ± 1 | 97 ± 1 |
| Shore C | 97 ± 1 | 97 ± 1 | 97 ± 1 | 97 ± 1 |
| Shore D | 70 ± 1 | 70 ± 1 | 70 ± 1 | 70 ± 1 |

The intermediate balls, as shown in Table 33 were then formed into finished golf balls by covering them with an outer cover formulation. The covers are typically ionomeric but other polymers may be utilized in the covers as set forth herein before. Ionomers typically associated with the golf balls according to the present invention include those designated as Surlyn®, manufactured by DuPont, and Iotek, manufactured by Exxon. The ionomers may be used individually or in blends. The following Table 35 includes ionomers which are exemplary of specific ionomers that may be utilized for the outer cover layer of golf balls according to the present invention.

TABLE 35

| | Outer Cover Ionomers | | | | | | |
|---|---|---|---|---|---|---|---|
| | Surlyn 8940 | Surlyn 9910 | Surlyn 8320 | Surlyn 8120 | Surlyn 8549 | Iotek 7030 | Iotek 7510 |
| % Acid Type | 15% MA | 16% MA | ~7% MA | ~7% MA | 15% MA | 15% AA | 6% AA |
| Ionomer Type | Copolymer | Copolymer | Terpolymer | Terpolymer | Copolymer | Copolymer | Terpolymer |
| Cation | Na | Zn | Na | Na | Na | Zn | Zn |
| Melt Index | 2.8 | 0.7 | 0.8 | 2 | 2.3 | 2.5 | 0.8 |
| Stiffness Modulus *2 | 2705 Kgf/cm$^2$ | 2874 Kgf/cm$^2$ | 168 Kgf/cm$^2$ | 492 Kgf/cm$^2$ | — | 1840 Kgf/cm$^2$ | 284 Kgf/cm$^2$ |

| | Iotek 7520 | Iotek 8000 |
|---|---|---|
| % Acid Type | 6% AA | 15% AA |
| Ionomer Type | Terpolymer | Copolymer |
| Cation | Zn | Na |
| Melt index | 2 | 2 |
| Stiffness Modulus *2 | 270 MPa | 3323 Kgf/cm$^2$ |

AA = Acrylic Acid; MA = Methacrylic Acid
*2 Stiffness measurements done using Toyoseiki Stiffness Tester The intermediate golf balls of Table 33 were then covered with cover formulations to produce the following finished golf balls:

TABLE 36

| | Finished Ball | | | |
|---|---|---|---|---|
| | A | B | C | D |
| Intermediate Ball (from Table 33) | 1 | 2 | 3 | 4 |
| Cover Composition (Wt %) | | | | |
| Surlyn 8549 (Na) | 7.3% | 7.3% | — | — |
| Iotek 7510 (Zn) | 42% | 42% | — | 58.9% |

TABLE 36-continued

| | Finished Ball | | | |
|---|---|---|---|---|
| | A | B | C | D |
| Iotek 7520 (Zn) | 50.7% | 50.7% | — | — |
| Surlyn 6940 (Na) | — | — | 17% | — |
| Surlyn 9910 (Zn) | — | — | 50.1% | — |
| Surlyn 8320 (Na) | — | — | 17.9% | — |
| Surlyn 8120 (Na) | — | — | 7.7% | — |
| Iotek 7030 (Zn) | — | — | 7.3% | 7.3% |

TABLE 36-continued

| | Finished Ball | | | |
|---|---|---|---|---|
| | A | B | C | D |
| Iotek 8000 (Na) | — | — | — | 33.8% |
| Whitener (TiO$_2$)* | 2.3 phr | 2.3 phr | 2.3 phr | 2.3 phr |

*Amount based on parts per hundred resin

The finished balls of Table 36 above had the following characteristics:

TABLE 37

| Property | Finished Ball (from Table 36) | | | |
|---|---|---|---|---|
| | A | B | C | D |
| Flex Modulus (weighted avg.) | 58 MPa | 58 MPa | 240 Mpa | 140 MPa |
| Stiffness Modulus (estimate) | ~300 Kgf/cm$^2$ | ~300 Kgf/cm$^2$ | 1820 Kgf/cm$^2$ | 763 Kgf/cm$^2$ |
| Combined Mantle / Cover Stiffness | ~700 Kgf/cm$^2$ | ~700 Kgf/cm$^2$ | 1942 Kgf/cm$^2$ | — |
| Cover Specific Gravity | 0.98 ± 0.01 | 0.98 ± 0.01 | 0.98 ± 0.01 | 0.98 ± 0.01 |
| Size | 1.685" ± 0.005 | 1.685" ± 0.005 | 1.685" ± 0.005 | 1.685" ± 0.005 |
| Weight | 45.4 g ± 0.4 | 45.4 g ± 0.4 | 45.4 g ± 0.4 | 45.4 g ± 0.4 |
| Riehle Compression | 105 ± 10 | 100 ± 10 | 95 ± 5 | 85 ± 5 |
| C.O.R. | 0.770 ± 0.015 | 0.780 ± 0.015 | 0.790 ± 0.015 | 0.790 ± 0.015 |
| JIS C | 72 ± 1 | 72 ± 1 | 93 ± 1 | 87 ± 1 |
| Shore C | 72 ± 1 | 72 ± 1 | 93 ± 1 | 87 ± 1 |
| Shore D | 46 ± 1 | 46 ± 1 | 62 ± 1 | 56 ± 1 |

An additional step of exposure to gamma radiation was performed on balls A and B of Table 37 producing golf balls having the following characteristics:

TABLE 38

| Finished Ball (From Table 37) | Finished Balls (Post Gamma) | | | |
|---|---|---|---|---|
| | A (Ball) | A (Core) | B (Ball) | B (Core) |
| Property (Post Gamma) | | | | |
| Gamma Dosage (Ball) | 35–70 Kgys | — | 35–70 Kgys | — |
| Size | 1.683" ± 0.003 | 1.47" ± 0.004 | 1.683" ± 0.003 | 1.47" ± 0.004 |
| Thickness (Cover) | 0.057" ± 0.008 | — | 0.057" ± 0.008 | — |
| Weight | 45.5 g ± 0.4 | 33.3 g ± 0.3 | 45.5 g ± 0.4 | 33.3 g ± 0.3 |
| Riehle Compression | 86 ± 5 | 120 ± 10 | 81 ± 5 | 110 ± 10 |
| C.O.R. | 0.795 ± 0.015 | 0.770 ± 0.020 | 0.800 ± 0.015 | 0.780 ± 0.020 |
| Cover Specific Gravity | 0.98 ± 0.01 | — | 0.98 ± 0.1 | — |
| Core Specific Gravity | — | 1.194 ± 0.05 | — | 1.194 ± 0.05 |
| JIS C | 72 ± 1 | 78 ± 2 | 72 ± 1 | 80 ± 2 |
| Shore C | 72 ± 1 | 78 ± 2 | 72 ± 1 | 80 ± 2 |
| Shore D | 46 ± 1 | 48 ± 2 | 46 ± 1 | 50 ± 2 |
| Dimple Pattern | 422 Tri | — | 422 Tri | — |

The method of gamma radiation treatment of golf balls, including benefits and property changes attained therefrom, is taught in commonly assigned U.S. Pat. No. 5,857,925 to Sullivan et al., which is incorporated herein by reference. Benefits and/or property changes associated with gamma radiation treatment of golf balls include, but are not limited to, increased melting temperature for the ionomer cover, increased compression and C.O.R. for the core, allows softer starting materials for core, etc.

EXAMPLE 9

In yet another preferred embodiment according to the present invention, golf balls having a core and a cover were formed according to the compositions provided below in Tables 39 to 41. The golf balls designated 1–4 below utilize polybutadiene rubbers which are not considered to be ultra high Mooney viscosity rubbers.

TABLE 39

| Materials | Cores | | | | | | |
|---|---|---|---|---|---|---|---|
| | 1 | 2 | 3 | 4 | 5 | 6 | 7 |
| Cariflex 1220 | 70 | 70 | 70 | 70 | — | — | — |
| Taktene 220 | 30 | 30 | 30 | 30 | — | — | — |
| BCP 820 (1220X) | — | — | — | — | 40 | 40 | 40 |
| Neo Cis 60 | — | — | — | — | 30 | 30 | 30 |
| Neo Cis 40 | — | — | — | — | 30 | 30 | 30 |
| Regrind | 10 | 20.5 | 20.5 | 17 | 0.2 | — | — |
| Zinc Oxide | 24.33 | 23 | 22.8 | 9.5 | 22.10 | 24 | 24 |
| Tungsten Powder | 0.17 | 0.17 | 0.17 | 0.17 | — | 0.17 | 0.17 |
| Zinc Stearate | 20 | 20 | 20 | 15 | 16.0 | 16.3 | 16.3 |
| ZDA | 22 | 22 | 23.2 | 19 | 24.30 | 20.5 | 20.5 |
| Red MB | — | — | — | — | 0.08 | 0.14 | 0.14 |
| Blue MB | — | — | — | — | 0.08 | — | — |
| Yellow MB | 0.14 | — | — | — | — | — | — |
| Black MB | — | 0.14 | 0.14 | — | — | — | — |
| Orange MB | — | — | — | 3.5 | — | — | — |
| PolyPro 20 Mesh | — | — | — | 0.15 | — | — | — |
| 231 XL or 29/40 | 0.9 | 0.9 | 0.9 | 0.9 | — | — | — |
| Trig 42–40B | — | — | — | — | 1.25 | 1.24 | 1.24 |

*amounts in parts per hundred resin

Golf ball cores having the following properties were produced from the core formulations of Table 39.

TABLE 40

| Properties | 1 | 2 | 3 | 4 | 5 | 6 | 7 |
|---|---|---|---|---|---|---|---|
| (Core) | | | | | | | |
| Size | 1.543" ± 0.008 | 1.543" ± 0.008 | 1.543" ± 0.008 | 1.570" ± 0.008 | 1.540" | 1.56" ± 0.005 | 1.56" ± 0.005 |
| Weight | 36.7 g ± 0.4 | 36.7 g ± 0.4 | 36.7 g ± 0.4 | 35.4 g ± 0.4 | 36.43 g | 38.0 g ± 0.004 | 38.0 g ± 0.004 |
| Riehle Comp. | 96 ± 8 | 105 ± 8 | 92 ± 8 | 115 ± 10 | 97 | 113 ± 9 | 113 ± 9 |
| C.O.R. | 0.795 ± 0.015 | 0.780 ± 0.015 | 0.780 ± 0.015 | 0.773 ± 0.015 | — | 0.780 ± 0.010 | 0.780 ± 0.010 |
| Specific Gravity | 1.168 ± 0.005 | 1.168 | 1.168 | 1.078 ± 0.004 | — | 1.16 | 1.16 |
| JIS C | 79 ± 2 | 77 ± 2 | 80 ± 2 | 77 ± 1 | — | 73 ± 1 | 73 ± 2 |
| Shore C | 79 ± 2 | 77 ± 2 | 81 ± 2 | 79 ± 1 | — | 75 ± 2 | 75 ± 2 |
| Shore D | 49 ± 2 | 48 ± 2 | 50 ± 2 | 45 ± 1 | — | 44 ± 1 | 44 ± 1 |

The cores, as shown in Table 40, were then formed into finished golf balls by covering them with an outer cover formulation. The covers are typically ionomeric but other poloymers may be utilized in the covers as set forth herein before. Ionomers typically associated with the golf balls according to the present invention include those designated as Surlyn®, manufactured by DuPont, and Iotek, manufactured by Exxon. The ionomers may be used individually or in blends. The following Table 41 includes ionomers which are exemplary of specific ionomers that may be utilized for the outer cover layer of golf balls according to the present invention.

TABLE 41

Outer Cover Ionomers

| | Surlyn 8940 | Surlyn 9910 | Surlyn 8320 | Surlyn 8120 | Surlyn 8549 | Surlyn 8552/6120 | Surlyn 8140 |
|---|---|---|---|---|---|---|---|
| % Acid Type | 15% MA | 15% MA | ~7% MA | ~7% MA | 15% MA | 19% MA | 19% MA |
| Ionomer Type | Copolymer | Copolymer | Terpolymer | Terpolymer | Copolymer | Copolymer | Copolymer |
| Cation | Na | Zn | Na | Na | Na | Na | Mg |
| Melt Index | 2.8 | 0.7 | 0.8 | 2 | 2.3 | 2.6 | 1.3 |
| Stiffness Modulus *2 | 2705 Kgf/cm² | 2874 Kgf/cm² | 168 Kgf/cm² | 492 Kgf/cm² | — | — | 3499 Kgf/cm² |

| | Iotek 7030 | Iotek 7510 | Iotek 7520 | Iotek 8000 | Iotek 1006 | Iotek 1007 |
|---|---|---|---|---|---|---|
| % Acid Type | 15% AA | 6% AA | 6% AA | 15% AA | 15% AA | 15% AA |
| Ionomer Type | Copolymer | Terpolymer | Terpolymer | Copolymer | Copolymer | Copolymer |
| Cation | Zn | Zn | Zn | Na | Na | Zn |
| Melt Index | 2.5 | 0.8 | 2 | 2 | 1.3 | 0.9 |
| Stiffness Modulus *2 | 1840 Kgf/cm² | 284 Kgf/cm² | 270 MPa | 3323 Kgf/cm² | 2719 Kgf/cm² | 1498 Kgf/cm² |

AA = Acrylic Acid; MA = Methacrylic Acid
*2 Stiffness measurements done using Toyoseiki Stiffness Tester Finished golf balls were prepared utilizing the cores from Table 40 above, and cover materials from Table 41 above. The finished golf balls are set forth in Table 42 below.

TABLE 42

| | Finished Ball | | | | | | | |
|---|---|---|---|---|---|---|---|---|
| | A | B | C | D | E | F | G | H |
| | Core (From Table 40) | | | | | | | |
| Cover Material(s) (Wt %) | 1 | 2 | 3 | 4 | 5 | 6 | 7 | 6 |
| Surlyn 8940 (Na) | 10.3 | — | — | — | 10.3 | — | 22.0 | — |
| Surlyn 9910 (Zn) | 26.8 | — | — | — | 26.8 | — | 54.4 | — |
| Surlyn 8320 (Na) | 38.2 | — | — | — | 38.2 | — | 10 | — |
| Surlyn 8120 (Na) | 15.0 | — | — | — | 15.0 | — | 1.00 | — |
| Surlyn 8549 | — | — | — | — | — | — | — | — |
| Iotek 7030 (Zn) | 9.7 | 9.7 | 9.7 | 9.7 | 9.7 | 9.7 | 9.7 | 9.7 |
| Iotek 7510 | — | — | — | — | — | — | — | — |
| Iotek 7520 | — | — | — | — | — | — | — | — |
| Iotek 8000 | — | — | — | — | — | — | — | — |
| Surlyn 8552/6120 (Mg) | — | 54.2 | 54.2 | — | — | 45.15 | — | 40.7 |
| Surlyn 8140 (Na) | — | 36.1 | 36.1 | — | — | — | — | — |
| Iotek 1006 | — | — | — | 36.1 | — | 45.15 | — | 46.8 |
| Iotek 1007 | — | — | — | 54.2 | — | — | — | — |
| Whitener (TiO₂)* | 3.1 phr | 3.1 phr | 3.1 phr | 3.1 phr | 3.1 phr | 3.1 phr | 3.1 phr | 3.1 phr |

*Parts per hundred resin

The finished golf balls of Table 42 were found to have the following properties:

TABLE 43

Finished Golf Balls (From Table 42)

| Properties | A | B | C | D | F | G |
|---|---|---|---|---|---|---|
| Flex Modulus (weighted avg.) | 154 MPa | 472 MPa | 472 MPa | 201 MPa | 379 MPa | 276 MPa |
| Stiffness Modulus | <1820 Kgf/cm$^2$ | — | — | — | — | — |
| Specific Gravity (Cover) | 0.98 ± 0.01 | 0.98 ± 0.01 | 0.98 ± 0.01 | 0.99 ± 0.01 | 0.98 ± 0.01 | 0.98 ± 0.01 |
| Size | 1.685" ± 0.005 | 1.685" ± 0.005 | 1.685" ± 0.005 | 1.715" ± 0.005 | 1.685" ± 0.005 | 1.685" ± 0.005 |
| Weight | 45.4 g ± 0.4 | 45.4 g ± 0.4 | 45.4 g ± 0.4 | 45.4 g ± 0.4 | 45.4 g ± 0.4 | 45.4 g ± 0.4 |
| Riehle Comp. | 90 ± 5 | 75 ± 5 | 70 ± 5 | 90 ± 5 | 95 ± 5 | 97 ± 3 |
| C.O.R. | 0.790 ± 0.015 | 0.810 ± 0.010 | 0.810 ± 0.010 | 0.805 ± 0.012 | 0.806 ± 0.009 | 0.803 ± 0.005 |
| JIS C | 85 ± 1 | 99 ± 1 | 99 ± 1 | 95 ± 1 | 95 ± 1 | 91 ± 1 |
| Shore C | 87 ± 1 | 99 ± 1 | 99 ± 1 | 97 ± 1 | 97 ± 1 | 93 ± 1 |
| Shore D | 59 ± 1 | 73 ± 1 | 73 ± 1 | 68 ± 1 | 69 ± 1 | 65 ± 1 |

The invention has been described with reference to the preferred embodiments. Obviously, modifications and alterations will occur to others upon reading and understanding the preceding detailed description. It is intended that the invention be construed as including all such alternations and modifications insofar as they come within the scope of the claims and the equivalents thereof.

Having thus described the preferred embodiment, the invention is now claimed to be:

1. A golf ball comprising:
   a core including (i) a first polybutadiene rubber obtained utilizing a cobalt catalyst and having a Mooney viscosity in the range of from about 70 to about 83, and (ii) a blend of polybutadiene rubbers wherein each is obtained by utilizing a lanthanide series catalyst and having a Mooney viscosity of from about 30 to about 70; and,
   a cover disposed about said core.

2. The golf ball of claim 1 wherein said first polybutadiene rubber includes at least 90% cis-1,4 polybutadiene.

3. The golf ball of claim 2 wherein said first polybutadiene rubber includes at least 95% cis-1,4 polybutadiene.

4. The golf ball of claim 1 wherein said first polybutadiene rubber has a polydispersity in the range of from about 1.9 to about 3.9.

5. The golf ball of claim 4 wherein said first polybutadiene rubber has a polydispersity in the range of from about 2.4 to about 3.1.

6. The golf ball of claim 1 wherein said blend of polybutadiene rubbers comprises a first polybutadiene having a Mooney viscosity of about 40 and a second polybutadiene having a Mooney viscosity of about 60.

7. The golf ball of claim 1 wherein said first polybutadiene rubber is present in an amount of about 40% by weight of the rubber composition of the core.

8. The golf ball of claim 1 wherein said blend of polybutadiene rubbers is present in an amount of about 60% by weight of the rubber composition of the core.

9. The golf ball of claim 8 wherein said blend of polybutadiene rubbers is comprised of about 30% by weight of a first polybutadiene having a Mooney viscosity of about 40 and about 30% by weight of a second polybutadiene having a Mooney viscosity of about 60.

10. The golf ball of claim 1 wherein the cover comprises an inner cover layer and an outer cover layer.

11. The golf ball of claim 10 wherein the inner cover layer is harder than the outer cover layer.

12. The golf ball of claim 10 wherein the inner cover layer is comprised of an ionomer resin or a blend of ionomer resins.

13. The golf ball of claim 10 wherein the outer cover layer is comprised of an ionomer resin or a blend of ionomer resins.

14. The golf ball of claim 12 wherein said inner cover layer further comprises a heavy weight filler.

15. The golf ball of claim 14 wherein the heavy weight filler is selected from tungsten, brass and bronze powder.

16. The golf ball of claim 1 wherein the core contains a heavy weight filler.

17. The golf ball of claim 16 wherein the heavy weight filler is tungsten.

18. The golf ball of claim 17 wherein the tungsten is present in an amount of at least about 0.17 parts per hundred resin.

19. The golf ball of claim 16 wherein the cover is a single layer.

20. The golf ball of claim 19 wherein the cover is formed from an ionomer resin or a blend of ionomer resins.

* * * * *

UNITED STATES PATENT AND TRADEMARK OFFICE
CERTIFICATE OF CORRECTION

PATENT NO.    : 6,422,953 B1
DATED         : July 23, 2002
INVENTOR(S)   : R. Dennis Nesbitt, Mark L. Binette, John L. Nealon and Michael J. Sullivan It is certified that error appears in the above-identified patent and that said Letters Patent is hereby corrected as shown below:

<u>Title page,</u>
Item [63], Related U.S. Application Data,
"which is a continuation-in-part of application No. 09/226,727, filed on Jan. 7, 1999, now Pat. No. 6,277,920, and a continuation-in-part of application No. 09/226,340, filed on Jan. 6, 1999, which is a continuation-in-part of application No. 08/819,945, filed on Mar. 19, 1997," should read -- which is a continuation-in-part of application No. 09/226,727, filed on Jan. 7, 1999, now Pat. No.6,394,915; and a continuation-in-part of application No. 09/226,340, filed on Jan. 6, 1999, now Pat. No. 6,277,920; both of which are continuations-in-part of application No. 08/819,945, filed on Mar. 18, 1997, --.

Signed and Sealed this

Twelfth Day of November, 2002

*Attest:*

*Attesting Officer*

JAMES E. ROGAN
*Director of the United States Patent and Trademark Office*